(12) United States Patent
McMahon et al.

(10) Patent No.: US 7,249,921 B2
(45) Date of Patent: Jul. 31, 2007

(54) EXPANDABLE/CONTRACTIBLE UNIVERSAL THERMAL BULKHEAD STRUCTURE FOR USE WITHIN REFRIGERATED CARGO CONTAINERS

(75) Inventors: Michael J. McMahon, Palatine, IL (US); Stanley Piotrowski, Addison, IL (US); Toby W. Clark, Phenix, AL (US); Tilak Varma, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 627 days.

(21) Appl. No.: 10/807,117

(22) Filed: Mar. 24, 2004

(65) Prior Publication Data

US 2005/0212316 A1 Sep. 29, 2005

(51) Int. Cl.
*B60P 7/08* (2006.01)
(52) U.S. Cl. .............. 410/129; 410/140; 296/24.41
(58) Field of Classification Search ............ 410/121, 410/129, 140; 296/24.41, 191, 24.4; 62/263, 62/329, 4; 52/794.1, 309.6; 220/529, 551; 160/40
See application file for complete search history.

(56) References Cited

U.S. PATENT DOCUMENTS

| | | | |
|---|---|---|---|
| 5,769,704 A | 6/1998 | Henning et al. | |
| 5,807,046 A | 9/1998 | Onken | |
| 5,947,812 A | 9/1999 | Henning et al. | |
| 5,993,310 A | 11/1999 | Onken | |
| 6,116,044 A | 9/2000 | Gothier | |
| 6,203,419 B1 | 3/2001 | Onken | |
| 6,877,940 B2* | 4/2005 | Nelson et al. | .............. 410/129 |

* cited by examiner

*Primary Examiner*—Stephen Gordon
(74) *Attorney, Agent, or Firm*—Schwartz & Weinrieb

(57) ABSTRACT

A new and improved thermal type bulkhead assembly comprises a pair of new and improved thermal type bulkhead members which are adapted to be adjustably positioned with respect to each other in an overlapped mode in the widthwise direction whereby oppositely disposed side edge portions of the pair of bulkhead members can effectively engage the oppositely disposed interior side walls of the refrigerated cargo container, while upper sections of the bulkhead members can flexibly engage the ceiling portion of the refrigerated cargo container. In this manner, the lateral extent or width dimension x of the thermal type bulkhead assembly, as well as the vertical extent or height dimension y of the thermal type bulkhead assembly, can be adjustably varied whereby the thermal type bulkhead assembly of the present invention is effectively universal in structure so as to be capable of being utilized within different refrigerated cargo containers characterized by different internal width and height dimensions.

24 Claims, 11 Drawing Sheets

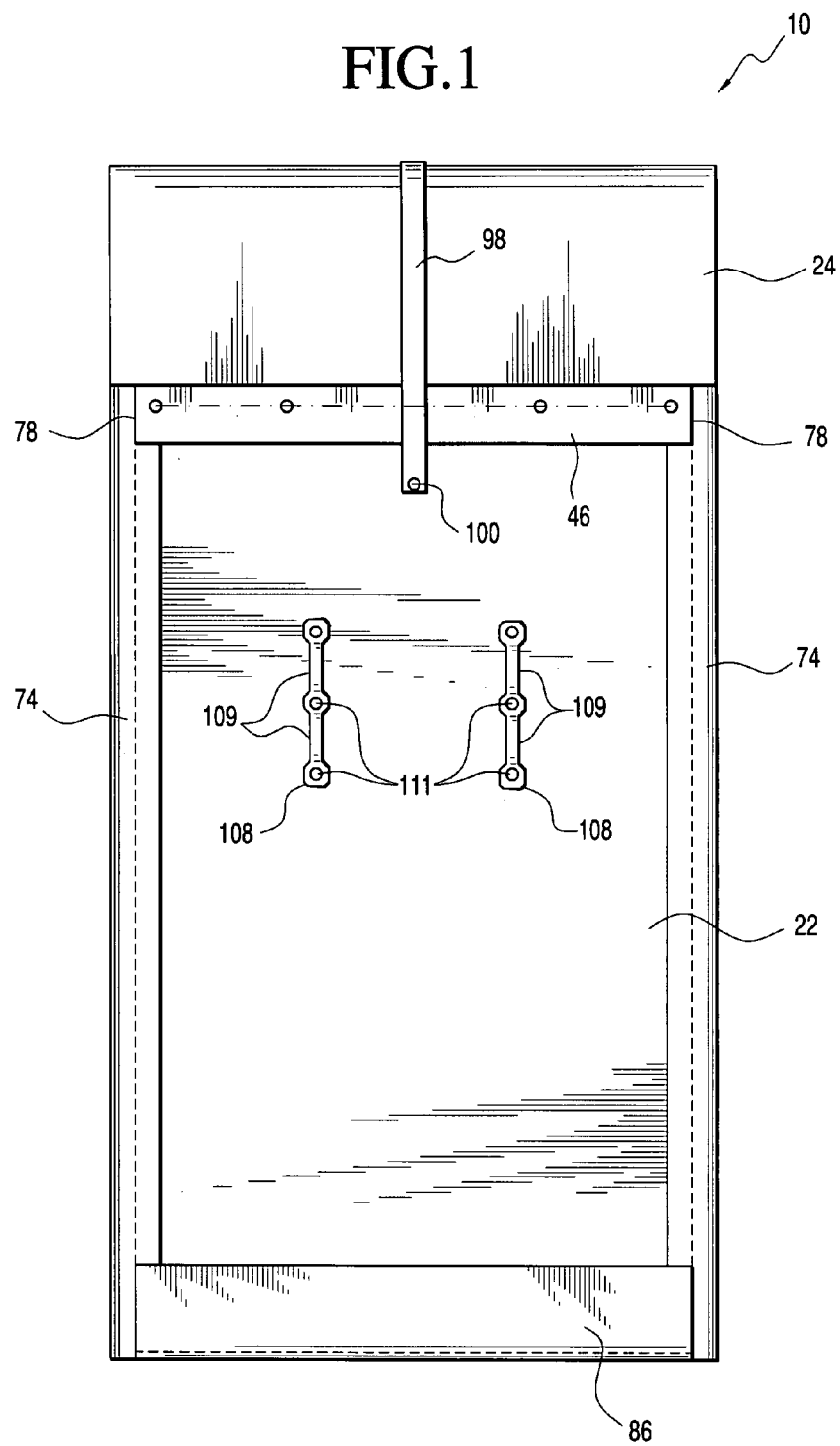

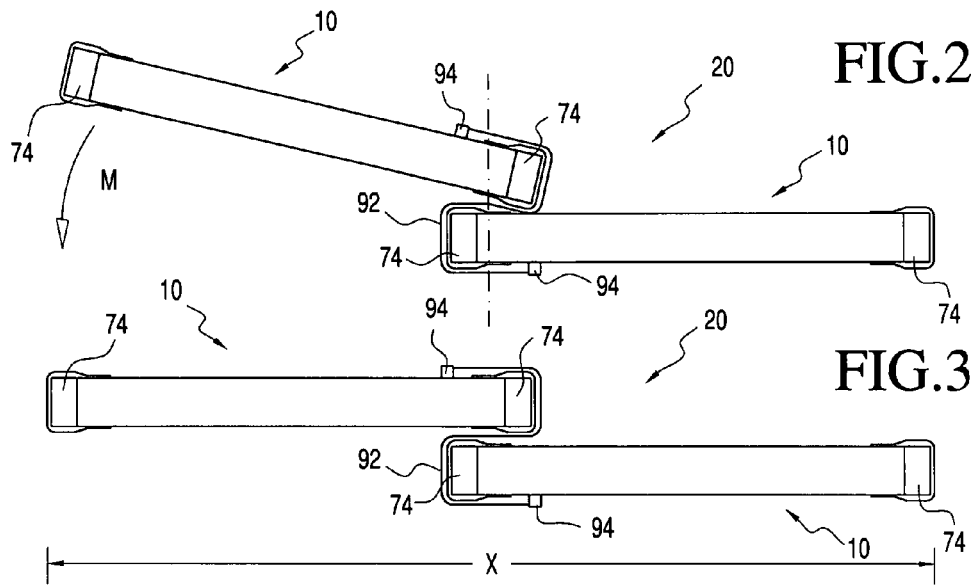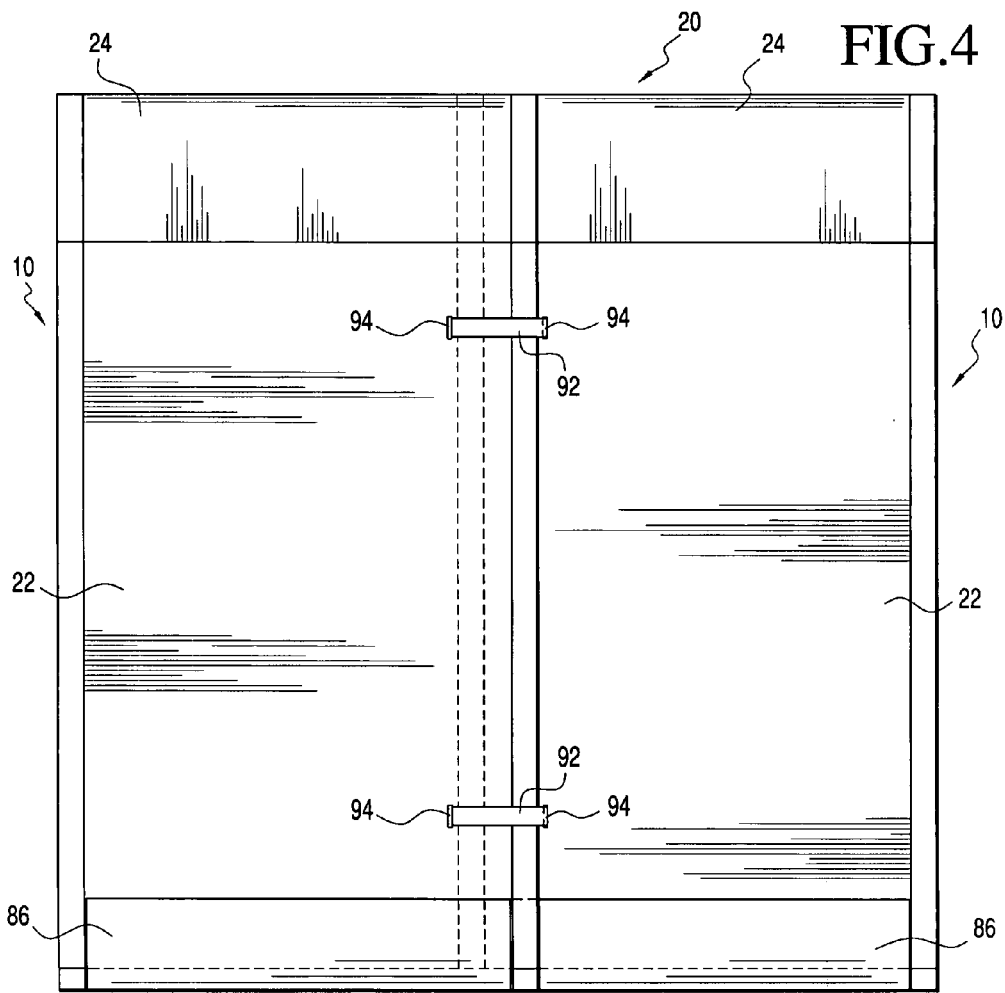

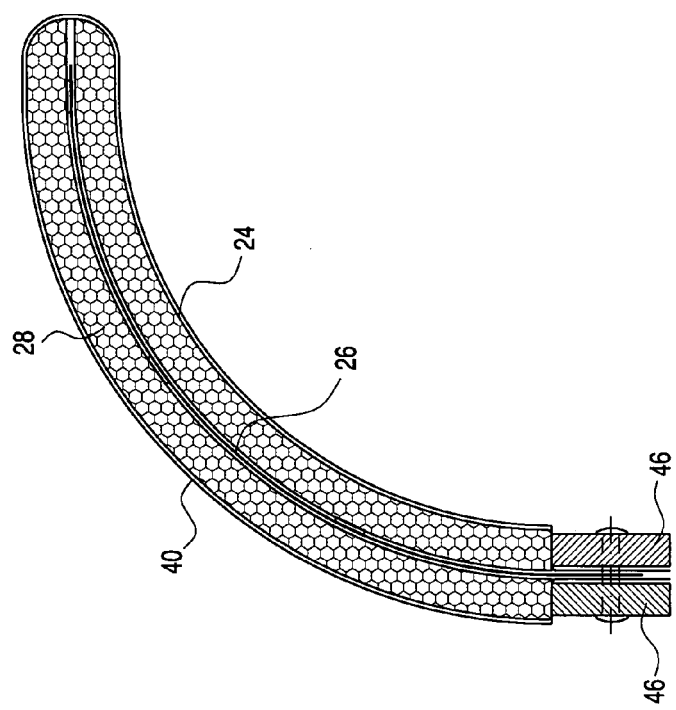
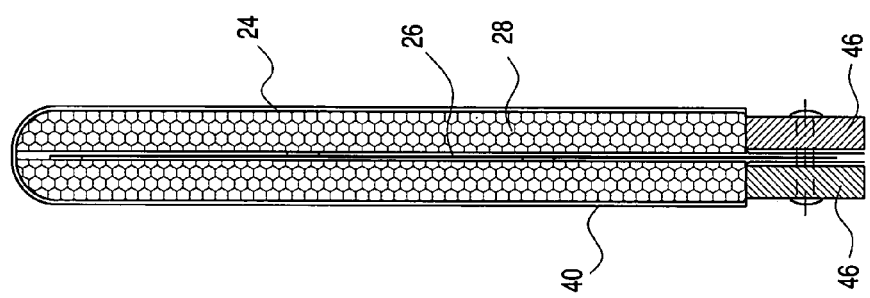
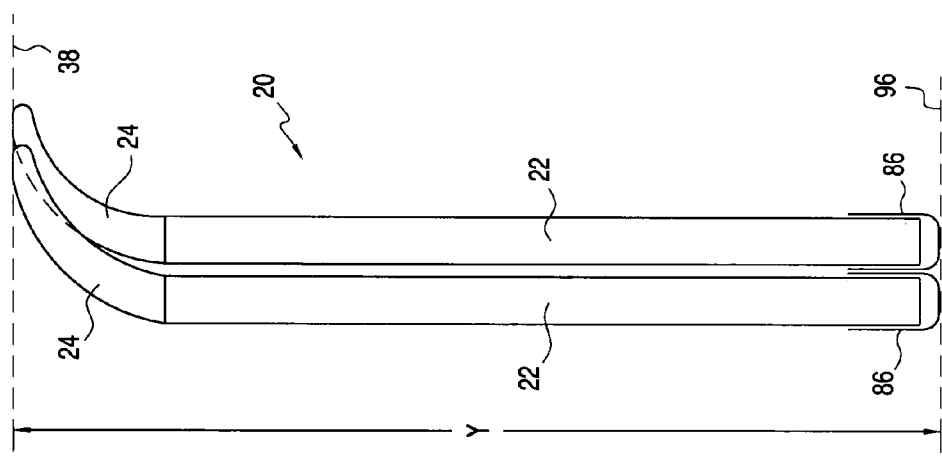
FIG.7
FIG.6
FIG.5

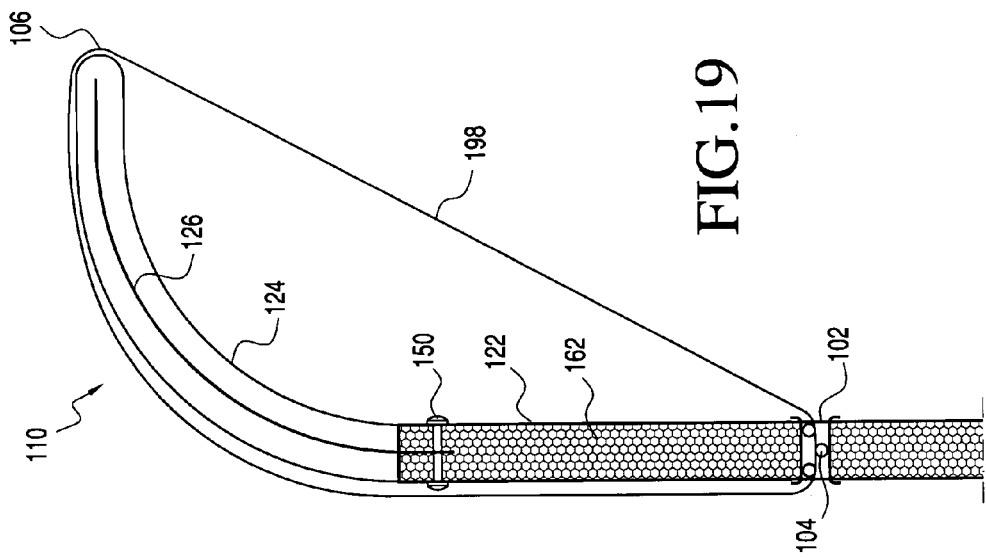
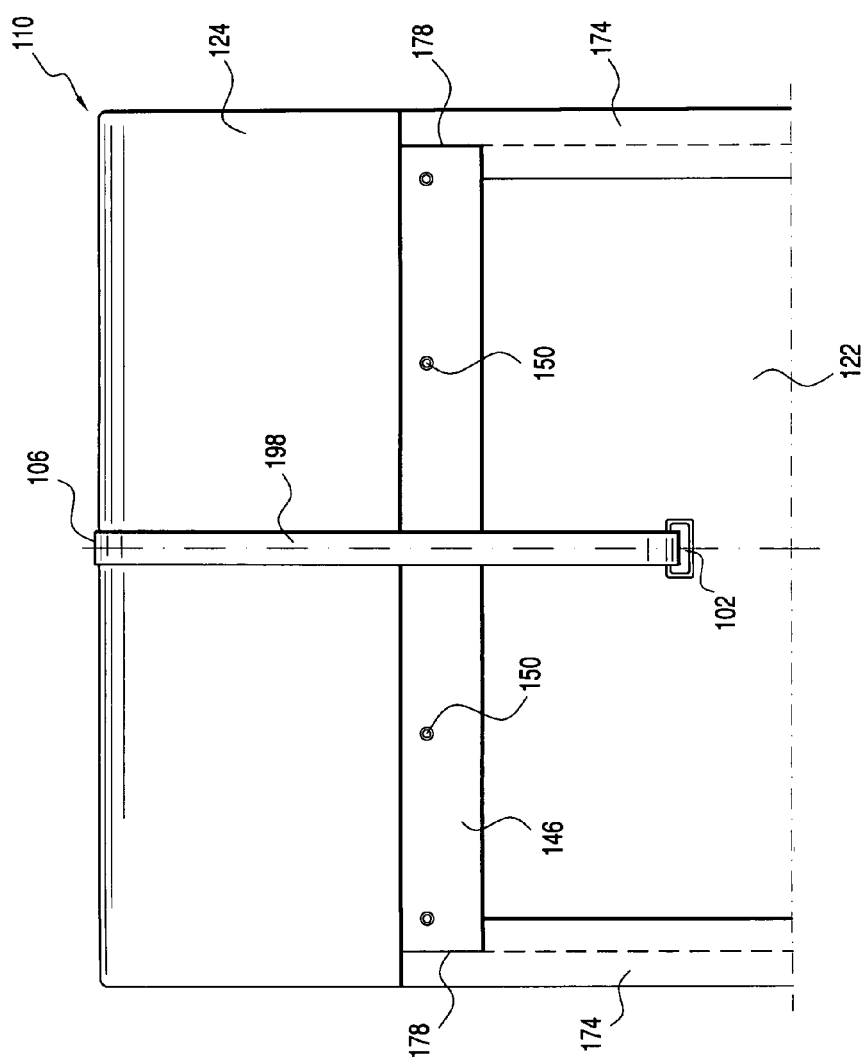

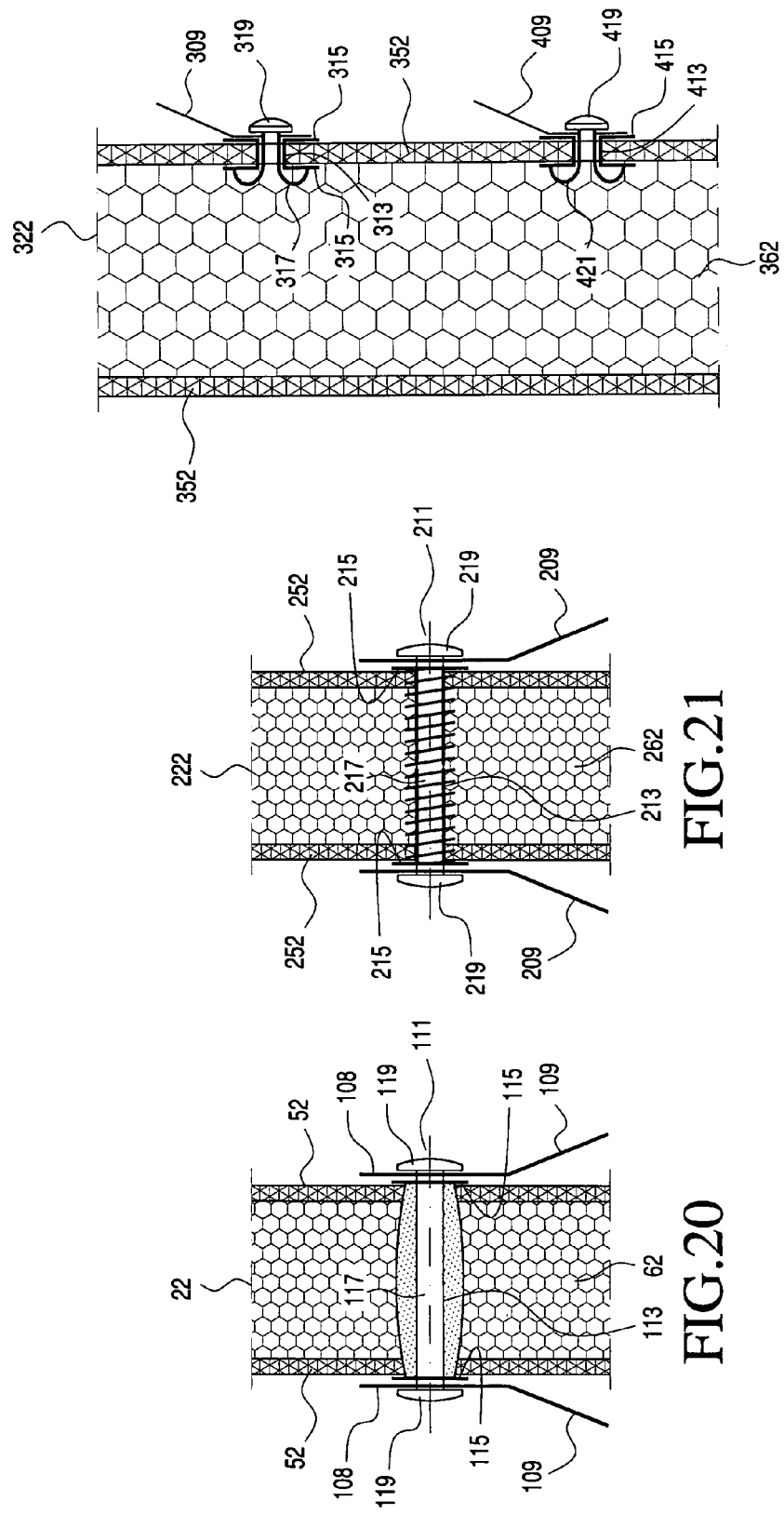

EXPANDABLE/CONTRACTIBLE UNIVERSAL THERMAL BULKHEAD STRUCTURE FOR USE WITHIN REFRIGERATED CARGO CONTAINERS

FIELD OF THE INVENTION

The present invention relates generally to thermal bulkhead structures which are conventionally incorporated within refrigerated cargo containers, such as, for example, those defined or present within refrigerated trucks, refrigerated trailers, refrigerated railroad cars, and the like, for defining and maintaining separate, insulated spaces characterized by different temperature levels or gradients, such as, for example, freezer compartments, refrigerated compartments, and dry compartments, and more particularly to a new and improved thermal bulkhead structure which is capable of being installed and used within different refrigerated cargo containers, which are characterized, for example, by means of different height and width dimensions, as a result of the fact that the new and improved thermal bulkhead structure, which is constructed in accordance with the principles and teachings of the present invention, has or is characterized by means of a predetermined, standardized size which is nevertheless expandable and contractible, whereby the new and improved thermal bulkhead structure therefore comprises a universal thermal bulkhead structure which can effectively be installed and used within any one of several differently sized refrigerated cargo containers, which are characterized by means of height and width dimensions which are within predetermined size ranges, regardless of the actual internal dimensions of such differently sized refrigerated cargo containers.

BACKGROUND OF THE INVENTION

Refrigerated cargo containers, such as, for example, those defined or present within refrigerated trucks, refrigerated trailers, refrigerated railroad cars, or the like, are conventionally used, for example, to house or store, and effectively maintain frozen or refrigerated, perishable cargo, while such perishable cargo is being transported in connection with its commercial distribution, in order to preserve such perishable cargo in its freshest possible condition or state. The refrigeration units are conventionally mounted within the forward end portions of the cargo containers, such as, for example, upon the front walls of the cargo containers. In accordance with conventional cooling processes, cycles, or methodology, cooled or conditioned air is discharged or exhausted from the refrigeration unit outlet, which is disposed within the upper region of the cargo container, such that the air is effectively conducted in the rearward direction and through the cargo container within the vicinity of the cargo container ceiling. At the same time, warmer air is drawn in the forward direction, through the lower region of the cargo container within the vicinity of the cargo container floor structure, so as to effectively be conducted or routed back toward, and into, the refrigeration unit inlet. Such return air is then able to be re-cooled or re-conditioned for recirculation back into the cargo container as a result of again being exhausted or discharged from the refrigeration unit outlet.

In order to properly facilitate or establish the aforenoted air flow patterns within the refrigerated cargo containers, one type of bulkhead structure that has been conventionally installed within refrigerated cargo containers comprises air return bulkhead structures which are disposed in spaced relationship with respect to the front walls of the refrigerated cargo containers so as to effectively define plenum chambers or spaces into which the warmer return air can be effectively be conducted back toward the refrigeration unit inlet. More particularly, the air return bulkhead structures, in addition to effectively defining the aforenoted plenum space or chamber, also serve to effectively protect the refrigeration units from being damaged, such as, for example, by means of the cargo loads which may tend to shift in place during the transportation of the same. Conventional air return bulkhead structures, of the aforenoted type, are disclosed, for example, within U.S. Pat. No. 6,203,419 which issued to Onken on Mar. 20, 2001, U.S. Pat. No. 6,116,044 which issued to Gothier on Sep. 12, 2000, U.S. Pat. No. 5,993,310 which issued to Onken on Nov. 30, 1999, U.S. Pat. No. 5,947,812 which issued to Henning et al. on Sep. 7, 1999, U.S. Pat. No. 5,807,046 which issued to Onken on Sep. 15, 1998, and U.S. Pat. No. 5,769,704 which issued to Henning et al. on Jun. 23, 1998. While all of the aforenoted air return bulkhead structures are constructed so as to achieve or perform their predetermined objectives in a substantially satisfactory or adequate manner, it is noted that such air return bulkhead structures do not comprise, in effect, thermal barriers which are required for defining separate freezer, refrigerated, and dry compartments within the refrigerated cargo container.

Accordingly, a second type of bulkhead structure that has conventionally been incorporated within refrigerated cargo containers is a thermal barrier type bulkhead structure, however, it is known that such conventional PRIOR ART thermal barrier type bulkhead structures have inherent operational, installation, and manufacturing drawbacks or disadvantages. For example, it is known in the art or industry that different cargo containers, as defined within differently sized trucks, trailers, railroad cars, or the like, are characterized by different internal width and height dimensions. It can therefore be readily appreciated that when a thermal barrier type bulkhead structure is to be internally incorporated within a particular refrigerated cargo container, it must obviously be manufactured or fabricated in accordance with predeterminedly precise dimensional specifications. It can be further readily appreciated, however, that such manufacturing or fabrication processing is very costly, such manufacturing or fabrication processing requires a substantial lead-time in order to achieve the manufacture or fabrication of the thermal bulkhead structure, and lastly, such manufacturing or fabrication processing results in a correspondingly long delivery time of the bulkhead structure to the end customer. While it is noted that the various air return bulkhead structures, as disclosed, for example, within the aforenoted patents which issued to Onken, do comprise upper support panels which are provided with ridges or other discontinuities along which a cutting tool may be guided so as to effectively form different spaces for accommodating differently sized refrigeration units, and while, still further, other structural components or parts of the air return bulkhead structures may likewise be removed so as to alter the return airflow patterns leading back to the refrigeration unit inlet, the provision and use of such severable structural components or parts nevertheless do not address the aforenoted problem concerning the requirement or need for providing individual, precisely sized thermal bulkhead structures which are to be internally incorporated within the differently sized refrigerated cargo containers. More particularly, it is noted that the air return bulkhead structures, as disclosed, for example, within the aforenoted patents which issued to Onken, are not capable of having their dimensional sizes expanded or contracted so as to effectively be used in a properly sealed manner with respect to the internal wall members of the differently sized refrigerated cargo containers which define the internal cargo container space within the refrigerated cargo containers.

A need therefore exists in the art for a new and improved thermal type bulkhead structure for incorporation within differently sized refrigerated cargo containers, such as, for example, those defined or present within refrigerated trucks, refrigerated trailers, refrigerated railroad cars, and the like, wherein the new and improved thermal type bulkhead structure can be readily and easily expanded and contracted so as to effectively alter the height and width dimensions of the thermal type bulkhead structure in order to permit the thermal type bulkhead structure to be utilized within differently sized refrigerated cargo containers in a properly sealed manner with respect to the internal wall members of the differently sized refrigerated cargo containers which define the internal cargo container space within the refrigerated cargo container. In this manner, the thermal type bulkhead structure can effectively comprise a single, universal thermal type bulkhead structure which could effectively be mass-produced and subsequently installed in an onsite manner within any particularly sized or dimensioned refrigerated cargo container so as to respectively define freezer, refrigerated, and dry compartments within the refrigerated cargo container. As a result of the provision of such a universal thermal type bulkhead structure, the need to manufacture or fabricate a multitude of differently sized or dimensioned thermal type bulkhead structures, in accordance with predetermined size dimensions characteristic of different, predetermined or specific refrigerated cargo containers, would be obviated, rendered unnecessary, and eliminated.

SUMMARY OF THE INVENTION

The foregoing and other objectives are achieved in accordance with the teachings and principles of the present invention through the provision of a new and improved thermal type bulkhead assembly which comprises a pair of new and improved thermal type bulkhead members which are adapted to be adjustably positioned with respect to each other in an overlapped mode in the widthwise direction whereby oppositely disposed side edge portions of the pair of bulkhead members can effectively engage the oppositely disposed interior side walls of the refrigerated cargo container, while upper sections of the bulkhead members can flexibly engage the ceiling portion of the refrigerated cargo container. In this manner, the lateral extent or width dimension X of the thermal type bulkhead assembly, as well as the vertical extent or height dimension Y of the thermal type bulkhead assembly, can be adjustably varied whereby the thermal type bulkhead assembly of the present invention is effectively universal in structure so as to be capable of being utilized within different refrigerated cargo containers characterized by means of different internal width and height dimensions.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a side elevational view, partly in cross-section, of a new and improved thermal type bulkhead member which has been constructed in accordance with the principles and teachings of the present invention and which shows the operative parts thereof;

FIG. 2 is a top plan view showing a pair of thermal type bulkhead members, as have been individually disclosed within FIG. 1, which are operatively connected together in a laterally overlapped mode and which are being angularly moved and positionally adjusted with respect to each other, by means of a plurality of S-shaped strapping members, only one of which is visible, so as to be properly operatively disposed internally within a refrigerated cargo container having a predetermined width dimension;

FIG. 3 is a top plan view, similar to that of FIG. 2, showing the pair of thermal type bulkhead members operatively connected together in their laterally overlapped mode and positionally adjusted with respect to each other, by means of the plurality of S-shaped strapping members, only one of which is visible, so as to form a new and improved thermal type bulkhead assembly, in accordance with the principles and teachings of the present invention, such that the oppositely disposed, laterally outward side edge portions of the thermal type bulkhead members can be operatively disposed into engagement with the oppositely disposed internal side wall portions of the refrigerated cargo container having the predetermined width dimension;

FIG. 4 is a side elevational view of the new and improved thermal type bulkhead assembly, as disclosed within FIG. 3, showing the pair of thermal type bulkhead members operatively connected together in their laterally overlapped mode by means of the vertically spaced S-shaped strapping members;

FIG. 5 is an end elevational view, corresponding to that of FIG. 4, showing the pair of thermal type bulkhead members operatively connected together in their laterally overlapped mode by means of the vertically spaced S-shaped strapping members wherein the vertically upper flexible portions of the thermal type bulkhead members are schematically illustrated as being operatively engaged with the internal ceiling wall portion of the refrigerated cargo container;

FIG. 6 is a cross-sectional view of the upper spring assembly component of the new and improved thermal type bulkhead member wherein the upper spring assembly component of the new and improved thermal type bulkhead member is disclosed in its non-deflected state;

FIG. 7 is a cross-sectional view of the upper spring assembly component of the new and improved thermal type bulkhead member wherein the upper spring assembly component of the new and improved thermal type bulkhead member is disclosed in its deflected state such as when the upper spring assembly component is disposed in engagement with a ceiling portion of a refrigerated cargo container;

FIG. 18 is a side elevational view, partly in cross-section and similar to that of FIG. 1 in that the same discloses a new and improved thermal type bulkhead member which has likewise been constructed in accordance with the principles and teachings of the present invention, however, there is shown a second embodiment of an adjustment strap mechanism which may be utilized to move the upper spring assembly from its undeflected position or state to its deflected position or state;

FIG. 19 is a cross-sectional view, similar to that of FIG. 7 but corresponding to that of FIG. 18, in that the same discloses the second embodiment of the adjustment strap mechanism for moving the upper spring assembly from its undeflected position or state to its deflected position or state;

FIG. 20 is an enlarged cross-sectional view illustrating a first embodiment of a fastener system for mounting the handle structure upon each side surface of the main or primary lower panel assembly of the thermal type bulkhead member;

FIG. 21 is an enlarged cross-sectional view, similar to that of FIG. 20, illustrating, however, a second embodiment of a fastener system for mounting the handle structure upon each side surface of the main or primary lower panel assembly of the thermal type bulkhead member;

FIG. 22 is an enlarged cross-sectional view, similar to those of FIGS. 20 and 21, illustrating, however, a third embodiment of a fastener system for mounting a handle structure, or other implement, upon only one side surface of the main or primary lower panel assembly of the thermal type bulkhead member;

DETAILED DESCRIPTION OF THE ILLUSTRATED EMBODIMENTS

Figure 8:
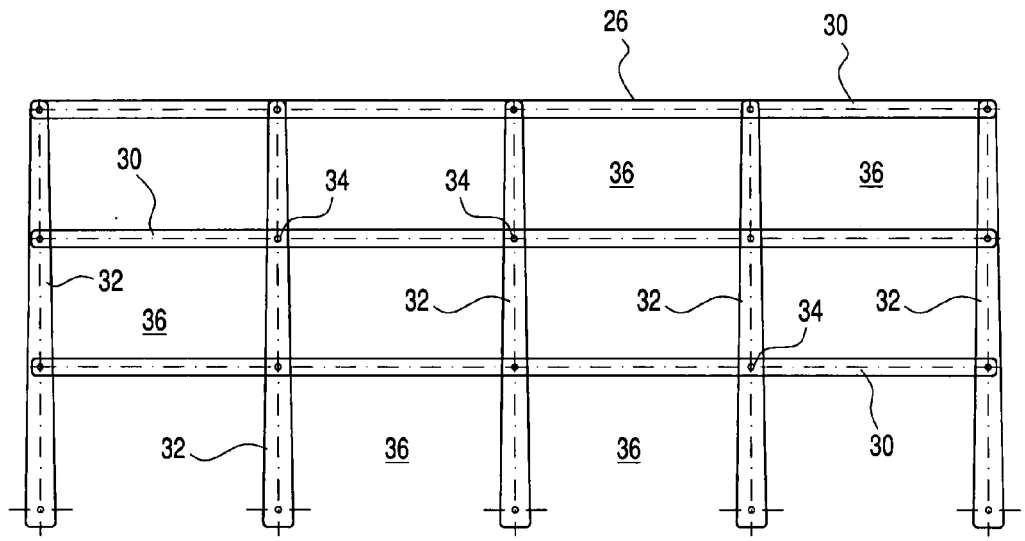
FIG. 8 is a side elevational view of a first embodiment of a central, internal core spring member which is effectively incorporated within the upper spring assembly component of the new and improved thermal type bulkhead member as disclosed within FIGS. 6 and 7.

Referring now to the drawings, and more particularly to FIG. 1 thereof, a new and improved thermal type bulkhead member, which has been constructed in accordance with the principles and teachings of the present invention, is disclosed and is generally indicated by the reference character 10. It is to be additionally noted that when the new and improved thermal type bulkhead member 10 is to be employed internally within a refrigerated cargo container, which has predetermined width and height dimensions, in order to, for example, define and maintain separated, insulated spaces, which are characterized by different temperature levels or gradients, such as, for example, freezer compartments, refrigerated compartments, dry compartments, and the like, within the refrigerated cargo container, a pair of the new and improved thermal type bulkhead members 10,10 are adapted to be operatively connected together in an adjustable manner so as to effectively form a new and improved thermal type bulkhead assembly, as disclosed within FIGS. 2–5, which is likewise constructed in accordance with the principles and teachings of the present invention, and which is generally indicated by the reference character 20. In accordance with further or additional principles and teachings of the present invention, by operatively connecting the pair of new and improved thermal type bulkhead members 10,10 together in the aforenoted adjustable manner so as to effectively form the new and improved thermal type bulkhead assembly 20, the width and height dimensions of the resulting thermal bulkhead assembly 20 can be varied so as to render the new and improved thermal type bulkhead assembly 20 of the present invention universally adaptable to different refrigerated cargo containers having, or characterized by means of, different width and height dimensions, as will be more fully discussed and appreciated hereinafter.

With reference again being made to FIG. 1, it is to be appreciated that each one of the thermal type bulkhead members 10 comprises a main or primary lower panel assembly 22, and an upper spring assembly 24, wherein the lower end portion of the upper spring assembly 24 is adapted to be fixedly attached or secured to the upper end portion of the main or primary lower panel assembly 22. More particularly, as illustrated within FIGS. 6 and 7, the upper spring assembly 24 is seen to comprise a central, internal core spring member 26, and an external foam blanket 28 which is effectively disposed or draped over the central, internal core spring member 26 so as to effectively envelop the same internally therein. As is additionally disclosed within FIGS. 8 and 9, a first embodiment of the central, internal core spring member 26 is seen to comprise a plurality of leaf spring members which are connected together so as to effectively form a grid-type or matrix-type structure having a substantially rectangular configuration.

In particular, it is seen that the grid-type or matrix-type structure, which comprises or defines the first embodiment of the central, internal core spring member 26, is seen to be composed of a plurality of vertically spaced horizontally oriented leaf spring members 30 and a plurality of laterally spaced vertically oriented leaf spring members 32. In addition, it is seen that the plurality of vertically spaced horizontally oriented leaf spring members 30 and the plurality of laterally spaced vertically oriented leaf spring members 32 are fixedly connected to each other, at the crisscrossed intersections thereof, by means of any one of different suitable fasteners 34 such as, for example, rivets, pins, or the like, and that a plurality of through-spaces 36 are defined between the intersecting leaf spring members 30,32. It is noted that the vertically oriented leaf spring members 32 are tapered along the vertical lengths thereof, and the reason for this is that such tapered structure provides the central, internal core spring member 26 with a substantially constant force over the vertical extent thereof. Accordingly, a uniform pressure is able to be exerted against the ceiling portion of the refrigerated cargo container when the upper spring assembly 24 is deflected from its normal, planar, undeflected position or state, as illustrated within FIG. 6, to its bent, arcuate, deflected position or state as a result of the upper spring assembly 24 being engaged with the ceiling portion 38 of the refrigerated cargo container as illustrated within FIGS. 5 and 7.

With reference continuing to be made to FIGS. 6 and 7, it is noted that the foam blanket 28 which overlies the oppositely disposed sides of the central, internal core spring member 26 is fabricated from a suitable open-cell foam material, such as, for example, open-cell polyurethane foam. Unlike closed-cell foam which can tend to become compression-set when subjected to pressure, open-cell foam can retain its resilience when subjected to pressure, and in this manner, the foam blanket 28 can effectively cooperate with the central, internal core spring member 26 in distributing the spring forces, generated by means of the leaf spring members 30,32, over the entire expanse of the upper spring assembly 24 such that substantially uniform contact pressures are, in turn, exhibited or generated throughout the entire expanse of the upper spring assembly 24. It is also noted that in order to optimally select or attain desired spring force parameters, the pitch or spacing between adjacent leaf spring members 30,32 may be varied. The foam blanket 28 is seen to comprise a single component which is effectively folded over the free or distal end portion of the central, internal core spring member 26, as can best be appreciated from FIGS. 6 and 7, and accordingly, once the foam blanket 28 is effectively folded in half upon itself, the oppositely disposed internal side faces of the foam blanket 28 may be, for example, adhesively bonded to each other through means of the spaces 36 defined between the intersecting leaf spring members 30, 32. In order to complete the fabrication of the upper spring assembly 24, a suitable fabric 40, such as, for example, NYLON®, having an external layer or coating of neoprene or other similar rubber elastomer, or a thin internal layer of polyvinylchloride (PVC), is secured over all of the external surface regions of the foam blanket 28, for reasons that will be explained more fully hereinafter, and the fabric 40 is adapted to be effectively closed or sealed upon itself so as to effectively prevent any moisture or water from penetrating, entering, or permeating the open-cell foam material comprising the foam blanket 28, wherein such moisture or water, particularly if the same became trapped within such open-cell foam material, would otherwise cause deterioration of the foam blanket 28. The fabric 40 may be secured to the external surface regions of the foam blanket 28 by means of a suitable adhesive, or alternatively, by means of suitable fasteners, fabric tufting techniques, or the like.

In any case, the attachment of the fabric 40 to the foam blanket 28 by any one of the aforenoted or similar means effectively permits the fabric 40 to stretch to the extent necessary as the upper spring assembly 24 is deflected from its normal, planar, undeflected position or state, as illustrated within FIG. 6, to its bent, arcuate, deflected position or state when the upper spring assembly 24 is engaged with the ceiling portion 38 of the refrigerated cargo container as illustrated within FIGS. 5 and 7. More particularly, as can be particularly appreciated from FIGS. 6, 7, and 10, lower, free end portions 42,42 of the fabric 40 are effectively tucked beneath the lower edge portions 44,44 of the half-sections of the foam blanket 28 which are disposed upon the opposite sides of the central, internal core spring member 26. It is also noted that the lower end portion of each one of the vertically oriented leaf spring members 32 of the central, internal core spring member 26 projects downwardly beneath the lower edge portions 44,44 of the foam blanket 28, and a pair of laterally extending support bars or support blocks 46,46 are disposed upon opposite sides of such lower end portions of the vertically oriented leaf spring members 32 of the central, internal core spring member 26 as can best be appreciated from FIGS. 1, 6, 7, 9, and 10. In this manner, the laterally extending support bars or support blocks 46,46 operatively cooperate with the lower end portions of the vertically oriented leaf spring members 32 of the central, internal core spring member 26 so as to effectively trap the lower, free end portions 42,42 of the fabric 40 between the laterally extending support bars or support blocks 46,46 and the lower end portions of the vertically oriented leaf spring members 32 of the central, internal core spring member 26.

Figure 10:
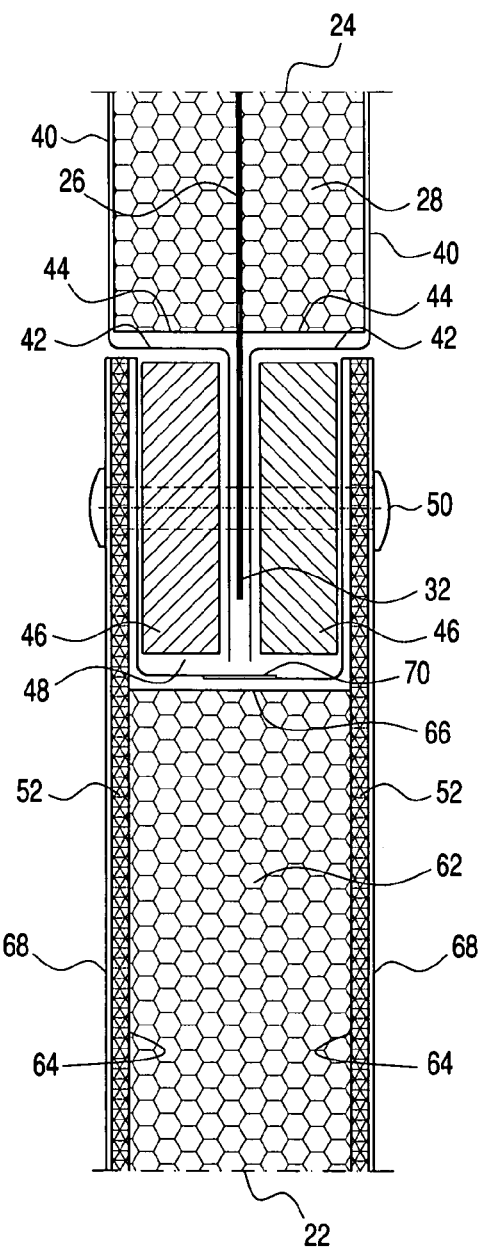
FIG. 10 is a cross-sectional view illustrating the recessed interface assembly by means of which the lower end portion of the upper spring assembly component of the new and improved thermal type bulkhead member is able to be fixedly secured or attached to the upper end portion of the main or primary lower panel assembly component of the new and improved thermal type bulkhead member.

As can be further appreciated from FIG. 10, and as will be discussed more fully hereinafter, the upper end portion of each one of the main or primary lower panel assemblies 22 is provided with a recessed region 48, and the assembly comprising the pair of laterally extending support bars or support blocks 46,46, the lower end portions of the vertically oriented leaf spring members 32 of the central, internal core spring member 26, and the lower end portions 42,42 of the protective fabric 40 are adapted to be fixedly secured within the recessed region 48 of each one of the main or primary lower panel assemblies 22 as a result of a plurality of fasteners 50, such as, for example, rivet type fasteners, being passed through plastic sheets or panels 52 which form the oppositely disposed external surface portions of each one of the main or primary lower panel assemblies 22, the pair of laterally extending support blocks or support bars 46,46, and the lower end portions of the vertically oriented leaf spring members 32 of the central, internal core spring member 26.

Figure 9:
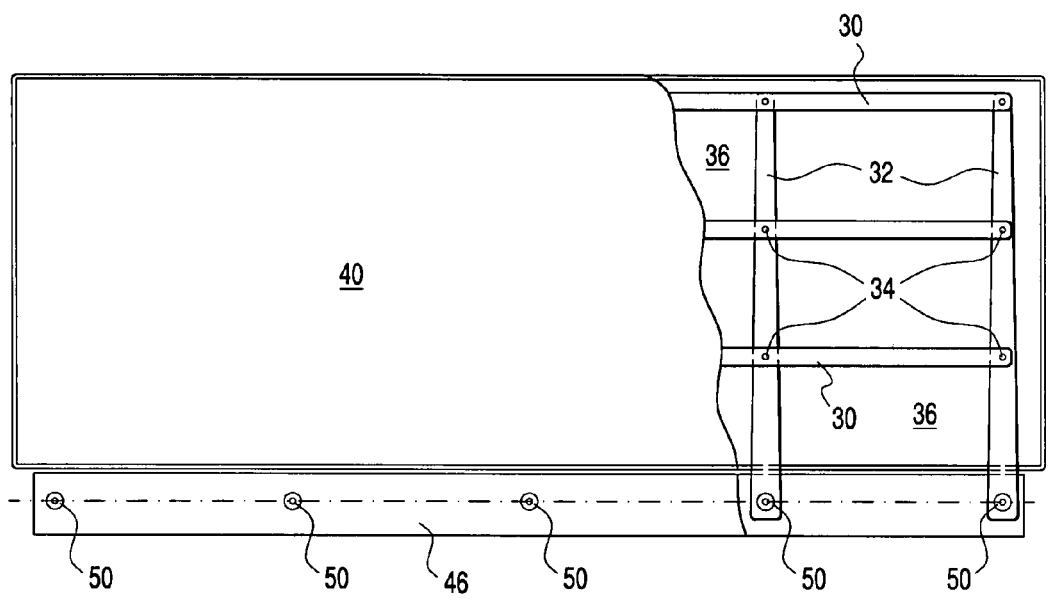
FIG. 9 is a side elevational view, partially in cross-section, of the first embodiment of the central, internal core spring member, as illustrated within FIG. 8, and as effectively incorporated within the upper spring assembly component of the new and improved thermal type bulkhead member as has been disclosed within FIGS. 6 and 7.
Figure 12:
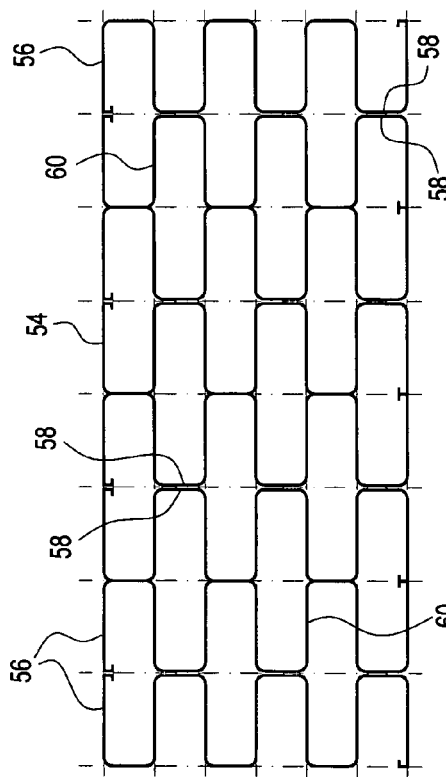
FIG. 12 is a side elevational view of the second embodiment of the central, internal core spring member which is fabricated from the plurality of wire-form spring members as disclosed within FIG. 11 and which may be incorporated within the upper spring assembly component of the new and improved thermal type bulkhead member of the present invention.
Figure 11:
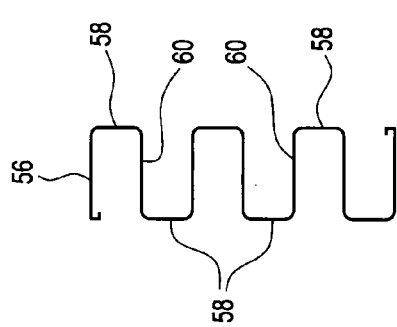
FIG. 11 is a side elevational view of a wire-form spring member which comprises one spring component of a second embodiment of a central, internal core spring member which may be incorporated within the upper spring assembly component of the new and improved thermal type bulkhead member of the present invention.

In lieu of the first embodiment of the central, internal core spring member 26, comprising the plurality of horizontally oriented leaf spring members 30 and the vertically oriented leaf spring members 32, as has been specifically disclosed within FIGS. 8 and 9 and as has been described hereinbefore, other types of central, internal core spring members may of course be employed or utilized within the upper spring assembly 24. For example, as disclosed within FIGS. 11 and 12, in lieu of the array of spring members comprising the plurality of horizontally oriented leaf spring members 30 and the vertically oriented leaf spring members 32, a second embodiment of a central, internal core spring member 54 may comprise a plurality of wire-form spring members 56 each one of which is planar and has a substantially serpentine configuration comprising a plurality of laterally spaced vertically oriented sections 58 and a plurality of vertically spaced horizontally oriented sections 60 integrally interconnecting the plurality of laterally spaced vertically oriented sections 58 together. It is also appreciated that adjacent ones of the plurality of wire-form spring members 56,56 are effectively disposed in a back-to-back mode such that adjacent ones of the vertically oriented sections 58,58 of the wire-form spring members 56,56 are disposed in abutting engagement with respect to each other. In this manner, the abutting sections 58,58 of the wire-form spring members 56,56 may be fixedly secured together, such as, for example, by suitable fasteners, welds, or the like, so as to in fact form the overall central, internal core spring member 54.

Figure 14:
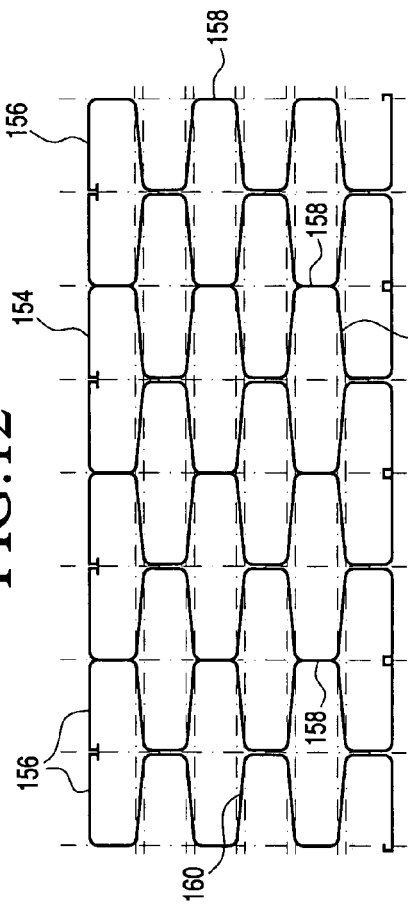
FIG. 14 is a side elevational view of the third embodiment of the central, internal core spring member which is fabricated from the plurality of wire-form spring members as disclosed within FIG. 12 and which may be incorporated within the upper spring assembly component of the new and improved thermal type bulkhead member of the present invention.
Figure 13:
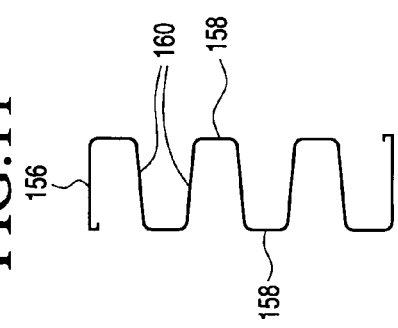
FIG. 13 is a side elevational view of a wire-form spring member which comprises one spring component of a third embodiment of a central, internal core spring member which may be incorporated within the upper spring assembly component of the new and improved thermal type bulkhead member of the present invention.

With reference alternatively being made to FIGS. 13 and 14, a third embodiment of a central, internal core spring member 154, similar to the central, internal core spring member 54, may likewise comprise a plurality of wire-form spring members 156 each one of which is planar and likewise has a substantially serpentine configuration comprising a plurality of laterally spaced vertically oriented sections 158 and a plurality of vertically spaced substantially horizontally oriented sections 160 integrally interconnecting the plurality of laterally spaced vertically oriented sections 158 together. It is noted, however, that in lieu of the plurality of vertically spaced substantially horizontally oriented sections 160 being disposed at true 90° orientations with respect to the plurality of laterally spaced vertically oriented sections 158, as was the case with the plurality of vertically spaced horizontally oriented sections 60 of the wire-form spring members 56 with respect the plurality of laterally spaced vertically oriented sections 58 of the wire-form spring members 56, the plurality of vertically spaced substantially horizontally oriented sections 160 define angular connections with respect to the plurality of laterally spaced vertically oriented sections 158 which comprise obtuse angles or, in other words, angles greater than 90°. It is also appreciated that, as was the case with the plurality of wire-form spring members 56,56, adjacent ones of the plurality of wire-form spring members 156,156 are likewise effectively disposed in a back-to-back mode such that adjacent ones of the vertically oriented sections 158,158 of the wire-form spring members 156,156 are disposed in abutting engagement with respect to each other. In this manner, the abutting sections 158,158 of the wire-form spring members 156,156 may be fixedly secured together, such as, for example, by suitable fasteners, welds, or the like, so as to in fact form the overall central, internal core spring member 154. As was the case with the leaf spring embodiment 26, it is lastly noted that the pitch or spacing defined between adjacent ones of the vertically oriented sections 158 of the spring members 156,156, as well as the pitch or spacing defined between adjacent ones of the substantially horizontally oriented sections 160 may be varied in order to optimally select or attain desired spring force parameters, With reference now being made to FIGS. 10, 15, and 16, the structural composition or arrangement of each one of the main or primary lower panel assemblies 22 of each one of the thermal type bulkhead members 10 will now be described. It is noted, with reference initially being made to FIG. 10, that, in a manner similar to that characteristic of each one of the upper spring assemblies 24, wherein it has been noted that each one of the upper spring assemblies 24 comprises or is fabricated from a suitable open-cell foam material, such as, for example, open-cell polyurethane foam, each one of the main or primary lower panel assemblies 22 of each one of the thermal type bulkhead members 10 similarly comprises or is likewise fabricated from a core member 62 which is fabricated from a suitable open-cell foam material, such as, for example, open-cell polyurethane foam. As has been previously noted in connection with the structure comprising the upper end portion of each one of the main or primary lower panel assemblies 22 of each one of the thermal type bulkhead members 10, and the connection of the upper end portion of each one of the main or primary lower panel assemblies 22 of each one of the thermal type bulkhead members 10 to a respective lower end portion of one of the upper spring assemblies 24 of each one of the thermal type bulkhead members 10, as disclosed within FIG. 10, the plastic sheets or panels 52, which effectively form the oppositely disposed external surface portions of each one of the main or primary lower panel assemblies 22 of each one of the thermal type bulkhead members 10, are laminated to the oppositely disposed side surfaces 64,64 of the open-cell foam core member 62.

In addition, it is also seen that the upper end portions of the plastic sheets or panels 52,52 extend above the upper end portion 66 of the open-cell foam core member 62 so as to effectively define the recessed region 48 within which the assembly, comprising the pair of laterally extending support bars or support blocks 46,46, the lower end portions of the vertically oriented leaf spring members 32 of the central, internal core spring member 26, and the lower end portions 42,42 of the protective fabric 40, is disposed. As was the case with the provision of the protective fabric 40 covering the external surfaces of the open-cell foam blanket 28 of each upper spring assembly 24, a suitable protective fabric 68, such as, for example, polyvinylchloride (PVC), is secured over all of the external side surface regions of the plastic sheets or panels 52,52. In addition, upper end portions of the protective fabric 68 are disposed over the upper or distal end portions of the plastic sheets or panels 52,52, the upper end portions of the protective fabric 68 are then adhesively bonded, for example, upon the interior side wall portions of the plastic sheets or panels 52,52 which form the recessed region 48 within which the assembly, comprising the pair of laterally extending support bars or support blocks 46,46, the lower end portions of the vertically oriented leaf spring members 32 of the central, internal core spring member 26, and the lower end portions 42,42 of the protective fabric 40, is disposed, and the free or distal end portions of the protective fabric 68 are then overlapped within the recessed region 48 so as to be bonded, such as, for example, by heat-sealing techniques, with respect to each other as at 70 in order to envelop and protect the open-cell foam core member 62.

As can be readily appreciated from FIG. 15, it is seen that protective structure, similar to that described in connection with the aforenoted disclosure illustrated within FIG. 10, comprising the protective fabric 68 disposed upon the external side surface regions of the plastic sheets or panels 52,52, and covering the upper end portion 66 of the open-cell foam core member 62, is likewise provided in connection with each vertically oriented side edge portion of each main or primary lower panel assembly component 22 of the new and improved thermal type bulkhead member 10. More particularly, it is seen that the protective fabric 68 is routed around each vertically oriented side edge portion 72 of the open-cell foam core member 62 so as to effectively prevent the ingress of moisture or water into the open-cell foam core member 62. In addition, it is noted that in order to permit each vertically oriented side edge portion 72 of each main or primary lower panel assembly component 22 of the new and improved thermal type bulkhead member 10 to properly mate with a respective one of the interior side wall portions of the refrigerated cargo container in a substantially air-tight or sealed manner, as well as to effectively mate with the other one of the main or primary lower panel assembly components 22 of the new and improved thermal type bulkhead member 10 in a substantially air-tight or sealed manner when the pair of thermal type bulkhead members 10,10 are overlapped with respect to each other so as to define the new and improved thermal type bulkhead assembly 20 as disclosed within FIGS. 2–4, each vertically oriented side edge portion 72 of each main or primary lower panel assembly component 22 of the new and improved thermal type bulkhead member 10 is provided with a vertically oriented side edge seal member 74.

Each vertically oriented side edge seal member 74 is fabricated from a suitable open-cell foam material, and in order to fixedly attach or secure the vertically oriented side edge seal member 74 to each vertically oriented side edge portion 72 of each main or primary lower panel assembly component 22 of the new and improved thermal type bulkhead member 10, a suitable fabric 76, such as, for example, NYLON®, having an external layer or coating of neoprene or other similar rubber elastomer, or a thin internal layer of polyvinylchloride (PVC), in a manner similar to that previously noted in conjunction with the fabric 40 disposed upon the foam member 28, is wrapped around and bonded to the external surface portions of the vertically oriented side edge seal member 74 whereby the free end portions of the fabric 76 are, in turn, bonded to the external surface portions of the polyvinylchloride (PVC) coated fabric 68 which are adhesively bonded to the external surface portions of the plastic sheets or panels 52. It is noted, as can best be appreciated from FIG. 1, that, if necessary, the upper end portions of each one of the vertically oriented side edge seal members 74,74 are recessed as at 78,78 so as to accommodate the laterally or transversely extending support bars or support blocks 46,46. Furthermore, it is to be noted that not only can the NYLON® fabric be coated with a neoprene-based elastomer, but from a broader application or point of view, any one of several suitable cross-linked elastomers containing the "diene" or "butadiene" moieties as part of the main chain may be employed. Examples of such materials are neoprene, butyl, and styrene-butadiene rubbers.

It is additionally noted that the primary function of the pair of thermal type bulkhead members 10,10, particularly when the pair of thermal type bulkhead members 10,10 are overlapped with respect to each other so as to effectively form or define the new and improved thermal type bulkhead assembly 20 as disclosed within FIGS. 2–4, is the formation or definition of a thermal barrier. Since each one of the pair of bulkhead members 10,10 primarily comprises plastic materials and air trapped within the bulkhead members 10,10, each one of the bulkhead members 10,10 effectively forms a good thermal insulator in view of the fact that plastic and static air are poor conductors of heat. Therefore, the bulkhead members 10,10 effectively prevent the definition or formation of a thermal bridge through or across which heat can be readily transferred from the relatively warm side of the thermal barrier or bulkhead to the relatively cold side of the thermal bulkhead or barrier.

It is further appreciated or known that the leakage of air around the edge portions of the bulkhead members 10,10 is the primary cause of a defective or malfunctioning thermal bulkhead or barrier because an open edge seal easily allows the transfer of cold and hot air across the bulkhead or barrier.

For example, when the blower upon the freezer unit is operating or is cyclically ON whereby the air pressure upon the freezer side of the barrier or bulkhead is therefore relatively high, cold air will leak around the edge seal structure and enter the relatively warm side of the thermal bulkhead or barrier. Conversely, when the blower upon the freezer unit is cyclically OFF, the air pressure is relatively low upon the cold side of the thermal bulkhead or barrier, and therefore the warmer air will tend to leak around the edge seal structure and enter the cold or freezer side of the barrier or bulkhead. In either case, such leakage will effectively reduce the intended performance of the thermal bulkhead or barrier, will lead to the deterioration of the perishable cargo products being transported within the refrigerated cargo container, and will effectively tax the efficiency of the freezer unit by requiring the freezer unit to operate more frequently during cyclical ON time periods. It is therefore essential that the seal structures defined along the side and top regions of the thermal bulkhead or barrier be as air-tight as possible. While the utilization of polyvinylchloride (PVC) coated fabric to cover the primary surfaces of the open-cell foam panels or core portions has been implemented as has been noted hereinbefore, it has been determined that the use of such polyvinylchloride (PVC) coated fabric in connection with the edge seal members 74,74 is less desirable which is why in accordance with the principles and teachings of the present invention, the vertically oriented edge seal members 74,74, as well as the other edge or linear seal lines or interfaces, such as, for example, upon the upper spring assembly 24, utilize the neoprene-coated NYLON® fabric, similar rubber elastomer-coated fabric, or ballistic-NYLON® fabric material with a suitable moisture-proof coating 76.

More particularly, it is noted that when a fabric, heavily-coated with polyvinylchloride (PVC), is subjected to relatively low temperature levels, such as, for example, in the vicinity of −20° F., the polyvinylchloride (PVC) coated fabric tends to become stiff, thereby operatively interfering with the rebound or memory characteristics of the open-cell foam members. The reason for this phenomena resides in the fact that the polyvinylchloride (PVC) coated fabric is characterized by means of a relatively high glass transition temperature (Tg) value under sub-zero applications. Accordingly, while the polyvinylchloride (PVC) coated fabric may be utilized upon the side surface portions of, for example, each main or primary lower panel assembly component 22 in order to protect the open-cell foam core members 62 thereof, use of such polyvinylchloride (PVC) coated fabric upon the edge seal members 74,74, or upon the upper spring assembly 24, does not provide such side edge seal members 74,74, or the upper edge portion of the spring assembly 24, with the requisite amount of flexibility and resiliency when subjected to relatively low freezer temperature levels. If, for example, the edge seal members 74,74, or the upper edge portion of the spring assembly 24, are somewhat compressed as a result of being subjected to various forces attendant the installation of the pair of thermal type bulkhead members 10,10, comprising the thermal type bulkhead assembly 20 as disclosed within FIGS. 2–4, within a particular refrigerated cargo container, the side or upper edge portions of the thermal type bulkhead members 10,10 may remain distorted or compressed, thereby providing passages therearound for air leakage. In short, it is imperative to the maintenance of desirably adequate or acceptable sealing properties that the covering material for the seal members must always flex along with the open-cell foam material during both compression and extension in order to ensure the integrity or maintenance of the sealing properties.

Accordingly, materials, such as, for example, the neoprene-coated NYLON® fabric, similar rubber elastomer-coated fabric, or ballistic-NYLON® fabric material with a suitable moisture-proof coating, 76 were selected for achieving such sealing properties in view of the fact that such materials exhibit a relatively low glass transition temperature (Tg) value under sub-zero applications. In addition, such materials also exhibit desirable or acceptable moisture resistance, puncture resistance, tensile strength, tear propagation, coefficient of friction, abrasion resistance, high temperature resistance under storage conditions, and vulcanization properties. Still further, it has been determined that such neoprene-coated NYLON® fabric, similar rubber elastomer-coated fabric, or ballistic-NYLON® fabric material having a suitable moisture-proof coating, 76 can be attachable to dissimilar materials, such as, for example, the polyvinylchloride (PVC) coated fabric by utilizing special adhesives or mechanical fasteners. Accordingly, the neoprene-coated NYLON® fabric, the similar rubber elastomer-coated fabric, or ballistic-NYLON® fabric material having a suitable moisture-proof coating, 76 can be utilized in connection with both the vertically oriented side edge seal members 74,74, as well as in connection with the upper spring assembly 24, for properly engaging and establishing an acceptable seal with respect to the side walls, as well as with respect to the ceiling portion 38 of the refrigerated cargo container as disclosed within FIG. 5.

Figure 15:
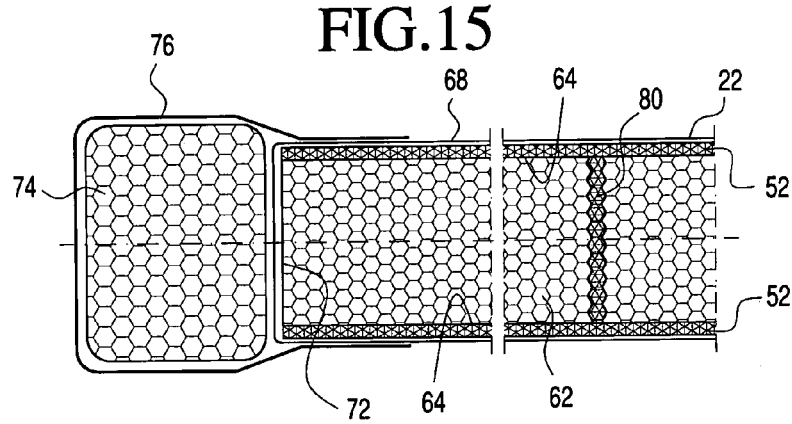
FIG. 15 is a cross-sectional view illustrating one of the side edge portions of the main or primary lower panel assembly component of the new and improved thermal type bulkhead member wherein each one of the side edge portions of the main or primary lower panel assembly component of the new and improved thermal type bulkhead member has a side edge seal member fixedly mounted thereon for not only mating with the interior side wall portions of the refrigerated cargo container but, in addition, such side edge seal member, disposed upon one of the main or primary lower panel assembly components of the new and improved thermal type bulkhead member, can also mate with the other one of the main or primary lower panel assembly components of the new and improved thermal type bulkhead member so as to define the sealed arrangement between the main or primary lower panel assembly components of the new and improved thermal type bulkhead member as disclosed within FIGS. 2–4.
Figure 16:
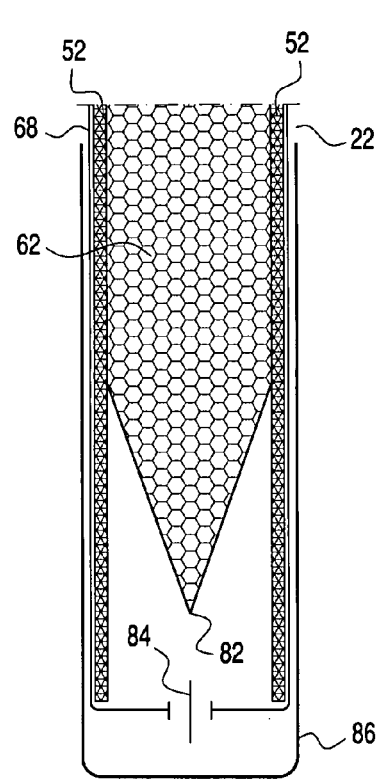
FIG. 16 is a cross-sectional view illustrating the lower end portion of one of the main or primary lower panel assembly components of the new and improved thermal type bulkhead member wherein the lower end portion of each one of the main or primary lower panel assembly components of the new and improved thermal type bulkhead member is provided with moisture or water drainage structure in addition to wear plate or kick plate structure in order to protect the thermal type bulkhead members during movement or transportation of the thermal type bulkhead members.

As an additionally important feature characteristic of the structural integrity of each one of the main or primary lower panel assembly components 22, it is also to be appreciated from FIG. 15 that one or more stiffener ribs 80 may be disposed internally within each one of the main or primary lower panel assembly components 22 so as to be disposed substantially perpendicular with respect to the plastic sheets or panels 52. It is particularly noted that while opposite ends of each stiffener rib 80 is operatively engaged with the in-ernal surfaces of the plastic panels or sheets 52 of the main or primary lower panel assembly components 22, the opposite ends of the stiffener ribs 80 are not fixedly connected to the internal surfaces of the plastic panels or sheets 52 of the main or primary lower panel assembly components 22. To the contrary, the stiffener ribs 80 are simply interposed between sections of the open-cell foam core members 62 whereby when the plastic panels or sheets 52 of the main or primary lower panel assembly components 22 are, for example, adhesively bonded to the open-cell foam core members 62, the stiffener ribs 80 will effectively be fixedly positioned within the main or primary lower panel assembly components 22 as a result of being entrapped within the main or primary lower panel assembly components 22 by means of the aforenoted assembly construction. In this manner, not only can the stiffener ribs 80 therefore preserve the structural integrity of the main or primary lower panel assembly components 22, but in addition, should the main or primary lower panel assembly components 22 be subjected to impact or other bending loads or forces, the stiffener ribs 80 can effectively move with the open-cell foam core members 62 such that when the open-cell foam core members 62 rebound, due to their inherent resiliency, the form of the main or primary lower panel assembly components 22 can effectively be preserved or returned to their original states.

As has been disclosed and described, while the structure of each one of the main or primary lower panel assembly components 22 comprises various externally disposed laminated layers, such as, for example, the polyvinylchloride (PVC) coated fabric 68 and the plastic sheets or panels 52,52, which effectively protect the internally disposed open-cell foam core member 62, it is possible that under extreme or severe conditions, such as, for example, attendant handling and transportation of the individual thermal type bulkhead members 10,10, the thermal type bulkhead members 10,10 may be damaged as a result of, for example, the puncturing of the polyvinylchloride (PVC) coated fabric 68 as well as the puncturing of the plastic sheets or panels 52,52. Under these circumstances, moisture and water might be able to effectively penetrate the main or primary lower panel assembly components 22 and enter the internal open-cell foam core member or structure 62 which could lead to the deterioration of the internal open-cell foam core member or structure 62 and the ultimate destruction or operative failure of an affected thermal type bulkhead member 10. It is noted, however, that as a result of the fabrication of the internal core structure or member 62 from open-cell material, the individual cells of the open-cell matrix are open and are relatively large in size. Accordingly, water does not tend to migrate vertically upwardly under the influence or phenomena of capillary action.

In addition, the open-cell structure characteristic of the internal open-cell foam core member or structure 62 effectively prevents any water from becoming trapped internally within the open-cell structure in view of the fact that the hydraulic pressure, caused by the height of the water head, will tend to force the water to drain through the fluidically connected cells of the open-cell structure. This operational phenomena effectively renders the internal open-cell foam core member or structure 62 self-draining such that any water which may be disposed internally within the internal open-cell foam core member or structure 62 of the main or primary lower panel assembly component 22 can in fact drain vertically downward toward the bottom edge portion or region of the thermal type bulkhead member 10. Accordingly, as may be readily appreciated from FIG. 16, additional structure has been incorporated within each main or primary lower panel assembly component 22 so as to in fact facilitate the aforenoted water drainage or fluid flow of the same away from the lower end portion of the internal open-cell foam core member or structure 62. More particularly, it is seen, for example, that the lower end portion of the internal open-cell foam core member 62 has a tapered configuration, as seen in cross-section, wherein the apex portion 82 of the internal open-cell foam core member 62 is oriented vertically downwardly. In addition, it is seen that the lower end portion of the polyvinylchloride (PVC) coated fabric 68, which spans or extends between the lower end portions of the oppositely disposed plastic sheets or panels 52,52, is provided with a weep hole 84.

Still yet further, it is desirable to protect the lower end portions of each one of the main or primary lower panel assembly components 22 of each one of the thermal type bulkhead members 10 during transportation or installation of the same in view of the fact that such lower end portions of each one of the main or primary lower panel assembly components 22 is subjected to impact or frictional forces which can tend to adversely affect the structural integrity of such lower end portions of each one of the main or primary lower panel assembly components 22. More particularly, in order to effectively protect the lower end portions of each one of the main or primary lower panel assembly components 22 of the thermal type bulk-head members 10 while the same are being moved or dragged with respect to, or over, the floor region of the refrigerated cargo container, such as, for example, when the thermal type bulkhead members 10 are being positioned, as indicated by the arrow M, as illustrated within FIG. 2, or alternatively, in order to protect the lower end portions of each one of the main or primary lower panel assembly components 22 of the thermal type bulkhead members 10 from being damaged by component handling equipment, such as, for example, forklift trucks, or the like, a substantially U-shaped kickplate or similar protective member 86 is adapted to be fixedly mounted upon or adhered or secured to the external surface areas of the polyvinylchloride (PVC) coated fabric 68 and the plastic sheets or panels 52,52 which cover the lower tapered portion 82 of the internal open-cell foam core member 62. The kickplate or similar protective member 86 may be fabricated from a suitable material, such as, for example, high-density polyethylene (HDPE).

Figure 17:
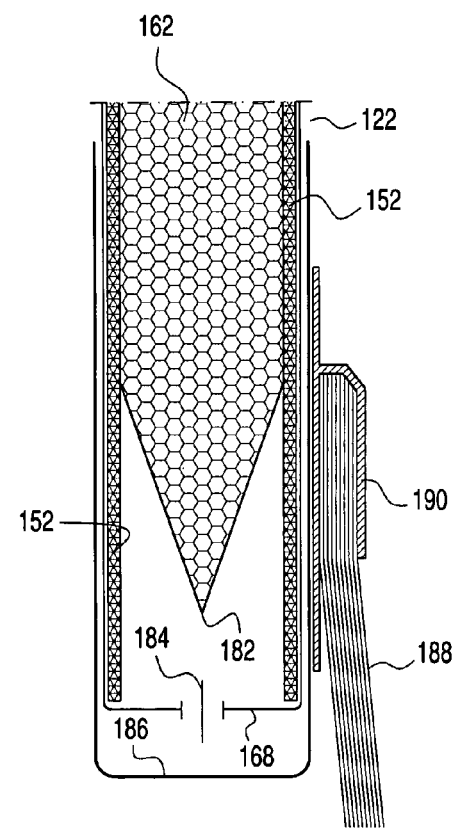
FIG. 17 is a cross-sectional view, similar to that of FIG. 16, illustrating, however, a modified embodiment of the lower end portion of one of the main or primary lower panel assembly components of the new and improved thermal type bulkhead member wherein the lower end portion of each one of the main or primary lower panel assembly components of the new and improved thermal type bulkhead member is provided with whisker or brush type structure for ensuring sealing of the main or primary lower panel assembly components of the new and improved thermal type bulkhead members with the floor regions of the refrigerated cargo containers which may have corrugated structure.

It is lastly seen, as illustrated within FIG. 17, that a modified embodiment of the lower end composite structure of each one of the main or primary lower panel assemblies 122 of the thermal type bulkhead members 10 may comprise a whisker or brush assembly 188 which is adapted to be fixedly mounted upon oppositely disposed external side portions of the kickplate or similar protective member 186 by means of a suitable mounting bracket 190, it being noted further that only one of the whisker or brush assemblies 188 has been illustrated for clarity purposes. The whisker or brush assemblies 188 are provided upon the oppositely disposed external side portions of the kickplate or similar protective member 186 so as to effectively seal the floor regions of the refrigerated cargo containers when the floor regions of the refrigerated cargo containers comprise corrugated structures or have corrugated configurations. It is also noted that a detailed description of the modified embodiment of the lower end composite structure of each one of the main or primary lower panel assemblies 122 has not been provided for brevity purposes, however, the various structural components of the main or primary lower panel assemblies 122, which correspond to the structural components of the main or primary lower panel assemblies 22, have been denoted by corresponding reference characters within the 100 series.

With reference again being made to FIGS. 1–7, it is to be appreciated that each one of the new and improved thermal type bulkhead members 10, as constructed in accordance with the principles and teachings of the present invention, is adapted to be completely symmetrical and reversible from both front surface and rear surface points of view, as well as from left side and right side points of view. In this manner, when, for example, a pair of the thermal type bulkhead members 10,10 are effectively connected together and employed internally within a refrigerated cargo container so as to effectively form or define the new and improved thermal type bulkhead assembly 20, it does not matter which particular one of the pair of the thermal type bulkhead members 10, 10 is used within the left side of the refrigerated cargo container or within the right side of the refrigerated cargo container, and in a similar manner, it does not matter if a particular side surface of a particular one of the pair of the thermal type bulkhead members 10,10 is facing toward the front end of the refrigerated cargo container or facing toward the rear end of the refrigerated cargo container. Still further, it is also to be appreciated that each upper spring assembly 24, as disposed upon the upper end portion of each thermal type bulkhead member 10, is able to be flexed in either one of two opposite directions with respect to the plane defined by means of the main or primary lower panel assembly 22.

In this manner, regardless of the positional orientation of either one of the pair of the thermal type bulkhead members 10, that is, whether a particular side surface of a particular one of the thermal type bulkhead members 10 is disposed forwardly or rearwardly, the upper spring assembly 24 of the particular thermal type bulkhead member 10 will be able to be flexed from its undeflected position, as illustrated within FIG. 6, to its deflected position, as illustrated within FIG. 7. Accordingly, the upper spring assemblies 24 of the pair of thermal type bulkhead members 10,10 can properly engage the ceiling portion 38 of the refrigerated cargo container, as illustrated within FIG. 5, when the pair of thermal type bulkhead members 10,10 are effectively connected together, employed internally within the refrigerated cargo container, and adjustably moved with respect to each other, as schematically denoted by means of the arrow M, so as to effectively form or define the new and improved thermal type bulkhead assembly 20 within the refrigerated cargo container whereby one side edge seal member 74 of one of the pair of thermal type bulkhead members 10 is tightly and sealingly engaged with, for example, the left interior side wall portion of the refrigerated cargo container while an opposite one of the side edge seal members 74 of the other one of the pair of thermal type bulkhead members 10 is tightly and sealingly engaged with, for example, the right interior side wall portion of the refrigerated cargo container.

With reference continuing to be made to FIGS. 2–4, it is seen that in order to operatively connect the pair of thermal type bulkhead members 10,10 together so as to in fact form or define the new and improved thermal type bulkhead assembly 20, a pair of vertically spaced tensioning straps 92,92 are adapted to be mounted upon the laterally inward side edge portions of each one of the pair of thermal type bulkhead members 10,10 wherein such laterally inward side edge portions of the pair of thermal type bulkhead members 10,10 are adapted to be disposed in a laterally overlapped mode with respect to each other along the longitudinal centerline of the refrigerated cargo container. As can best be appreciated from FIGS. 2 and 3, each one of the vertically spaced tensioning straps 92,92, when mounted upon the thermal type bulkhead members 10,10, is seen to have a substantially S-shaped configuration wherein each one of the tensioning straps is routed around the laterally inward side edge portions of the pair of thermal type bulkhead members 10,10, and the opposite ends of the tensioning straps 92,92 are respectively connected to suitable tensioning or tie-down mechanisms, cam buckle mechanisms, or the like, 94,94 which are respectively mounted upon the external side surface portions of the pair of thermal type bulkhead members 10,10. Accordingly, depending upon the extent to which the tensioning straps 92,92 are effectively tensioned by means of the tensioning or tie-down mechanisms, cam buckle mechanisms, or the like, 94,94 so as to effectively adjust the lengths of the tensioning straps 92,92, the extent to which the laterally inward side edge portions of the pair of thermal type bulkhead members 10,10 can be overlapped with respect to each other can be variably adjusted so as to, in turn, variably adjust the overall width dimension x of the thermal type bulkhead assembly 20. In this manner, the overall width dimension X of the thermal type bulkhead assembly 20 can be adjusted so to permit the thermal type bulkhead assembly 20 to be accommodated within a refrigerated cargo container having a predetermined width dimension X as defined between the oppositely disposed side walls thereof. In addition, as a result of the proper tensioning of the tensioning or tie-down straps 92,92, the tensioning or tie-down straps 92,92 effectively form a hinge structure by means of which the pair of thermal type bulkhead members 10,10 are movable with respect to each other, and still further, the laterally inward side edge portions of the pair of thermal type bulkhead members 10,10 are effectively forced together so as to be disposed in a tightly sealed manner.

In a similar manner, and as can best be appreciated from FIG. 5, due to the inherent flexibility characteristic of the pair of upper spring assemblies 24,24 of the pair of thermal type bulkhead members 10,10, when each one of the upper spring assemblies 24,24 is moved from its planar, undeflected position, as illustrated within FIG. 6, to its arcuate, deflected position, as illustrated within FIGS. 5 and 7, the overall height dimension Y of the thermal type bulkhead assembly 20 can effectively be adjusted so as to permit the thermal type bulkhead assembly 20 of the present invention to be accommodated within a refrigerated cargo container having a predetermined height dimension Y as defined between the ceiling portion 38 of the refrigerated cargo container and the floor portion 96 of the refrigerated cargo container. It is of course to be further appreciated that as a result of the inherent resiliency of the pair of upper spring assemblies 24,24 of the pair of thermal type bulkhead members 10, 10, the distal or free end portions of the pair of upper spring assemblies 24,24 of the pair of thermal type bulkhead members 10,10 will tightly and sealingly engage the ceiling portion 38 of the refrigerated cargo container.

In order to in fact achieve or facilitate the arcuate deflection of the upper spring assemblies 24,24 from their planar, undeflected positions or states, as illustrated within FIG. 6, to their arcuate, deflected states or positions, as illustrated within FIGS. 5 and 7, in order to adjust the height dimension of each one of the pair of thermal type bulkhead members 10,10 in preparation for the accommodation of the thermal type bulkhead assembly 20 within the refrigerated cargo container having the predetermined height dimension Y, and in order to, in turn, facilitate the movement of one or both of the pair of thermal type bulkhead members 10,10 from their respective positions illustrated within FIG. 2 to their finalized positions illustrated within FIG. 3, a vertically oriented adjustment strap 98 is provided upon each side of each one of the pair of thermal type bulkhead members 10,10. As can be appreciated from FIG. 1, it being noted that only one of the adjustment straps 98 is visible, an upper end portion of the adjustment strap 98 is adapted to be fixedly secured to the free or distal end portion of the upper spring assembly 24, while the lower end portion of the adjustment strap 98 is fixedly secured to an upper end portion of the main or primary lower panel assembly component 22 as at 100. Accordingly, depending upon the direction in which the particular upper spring assembly 24 is to be arcuately deflected with respect to the plane of the main or primary lower panel assembly component 22, workmen personnel can grasp a particular one of the adjustment straps 98 disposed upon a particular side of the upper spring assembly 24 and by pulling upon the same, the arcuate deflection of the upper spring assembly 24 in the desired direction can be achieved. Of course other tensioning or holding implements may be utilized in conjunction with the adjustment straps 98 in order to in fact facilitate the adjustment or manipulation of the same.

With reference now being made to FIGS. 18 and 19, a second embodiment of an upper spring assembly adjustment strap mechanism is disclosed, and it is to be appreciated that in lieu of the separate adjustment straps 98 disposed upon the opposite sides of each upper spring assembly 24, a single, endless loop, vertically oriented adjustment strap 198 may be routed upwardly along one upper side surface portion of the main or primary lower panel assembly component 122, upwardly along one side surface portion of the upper spring assembly 124 and over the free or distal end portion of the upper spring assembly 124, downwardly along the opposite side surface portion of the upper spring assembly 124 and the opposite upper side surface portion of the main or primary lower panel assembly component 122, and through an apertured region 102 defined within the main or primary lower panel assembly component 122. A plurality of roller mechanisms 104 are disposed within the apertured region 102 of the main or primary lower panel assembly component 122, and it is noted that the adjustment strap 198 is fixedly secured to the free or distal end portion of the upper spring assembly 124 as at 106. The roller mechanisms 104 not only tend to facilitate the movement of the adjustment strap 198 through the apertured region 102, but in addition, the roller mechanisms 104 effectively define a seal mechanism within the apertured region 102 such that air leakage from one side of the thermal type bulkhead member 110 to the other side of the thermal type bulkhead member 110 cannot occur. Accordingly, when it is desired to deflect the upper spring assembly 124 of any one of the thermal type bulkhead members 110 in a particular one of the two directions, the adjustment strap 198 is grasped and effectively pulled through the array of roller mechanisms 104 until the particular one of the pair of thermal type bulkhead members 110,110 is disposed at its proper position within the refrigerated cargo container whereupon release of the adjustment strap 198, the resiliency and flexibility characteristic of the upper spring assembly 124 will permit the same to sealingly engage the ceiling region of the refrigerated cargo container.

With reference now being made to FIGS. 1 and 20, it is noted that a last feature of each one of the new and improved thermal type bulkhead members 10 constructed in accordance with the principles and teachings of the present invention resides in the provision of means upon each one of the thermal type bulkhead members 10 for enabling or facilitating the easy handling of any one of the thermal type bulkhead members 10. More particularly, each side surface of the main or primary lower panel assembly component 22 of the thermal type bulkhead member 10, that is, the front side surface of the main or primary lower panel assembly component 22 of the thermal type bulkhead member 10 as well as the rear side surface of the main or primary lower panel assembly component 22 of the thermal type bulkhead member 10, is provided with a pair of laterally spaced, vertically oriented handle assemblies 108,108. Each handle assembly 108 is seen to comprise a plurality of vertically spaced handle members 109,109 which permit any individual one of the installation personnel to grasp any one of the handle members 109,109 at an elevational level which is comfortable for that particular individual one of the installation personnel. It is to be appreciated further that the individual or separate handle members 109,109 are defined within the respective handle assemblies 108,108 as a result of the handle structures comprising the handle assemblies 108,108 being fixedly secured to and upon each side surface of the main or primary lower panel assembly components 22 of the thermal type bulkhead member 10 by means of a plurality of vertically spaced suitable fastener assemblies 111.

More particularly, as can best be appreciated from FIG. 20, which comprises an enlarged view clearly illustrating a first embodiment of one of the fastener assemblies 111, it is seen that each first embodiment fastener assembly 111 comprises, in effect, a through-bolt assembly and is adapted to be used when it is desired to effectively secure both sides of the main or primary lower panel assembly component 22 together. More particularly, it is seen that each one of the fastener assemblies 111 comprises a tubular member 113, having a bowed or rolling pin type configuration, wherein it is seen that the opposite ends of the tubular member 113 are respectively provided with flanged or headed members 115,115. The tubular member 113 passes through the entire thickness extent of the main or primary lower panel assembly component 22, and in this manner, it is seen that the flanged or headed members 115,115 are disposed or seated upon the external surface portions of the plastic sheets or panels 52, or more particularly, upon the external surface portions of the polyvinylchloride (PVC) coated fabric 68, which would normally be disposed over the plastic sheets or panels 52,52, although it is noted that for clarity purposes, the polyvinylchloride (PVC) coated fabric 68 is not illustrated within FIG. 20.

In addition, a rivet or similar type fastener is adapted to be operatively connected to or associated with the tubular member 113 such that a shank portion 117 of the rivet or similar type fastener is disposed internally within the tubular member 113 which therefore effectively comprises a sleeve member. Continuing further, it is additionally seen that oppositely disposed flanged or headed members 119,119 of the rivet or similar type fastener are adapted to abuttingly engage or be seated upon the flanged or headed members 115, 115 of the tubular sleeve-type member 113 in order to effectively capture and secure the end portions of each handle member 109,109 therebetween. It is therefore to be appreciated still further that, as a result of the structural assembly comprising each fastener assembly 111, that is, the operative interaction defined between the tubular sleeve-type member 113 and its flanged or headed members 115, 115, and the rivet or similar type fastener comprising the shank portion 117 and its flanged or headed members 119,119, then when such tubular sleeve-type member 113 and the rivet fastener are assembled together, the bowed or rolling-pin configuration of the tubular sleeve-type member 113 will effectively prevent any collapsing together of the oppositely disposed plastic sheets or panels 52,52. Alternatively, the tubular member 113 may be fabricated from a relatively hard elastomer which is axially compressible so as to ultimately attain the bowed or rolling pin type configuration when the rivet type fastener is operatively fastened or secured within the tubular member 113.

It is therefore to be noted still further that, in accordance with this particular structural arrangement of each one of the fastener assemblies 111 as mounted upon the main or primary lower panel assembly component 22, when, for example, pulling forces are exerted or impressed upon the handle members 109,109, the forces will effectively be distributed throughout the various components comprising the main or primary lower panel assembly component 22 and not just exerted or impressed upon one side surface of the main or primary lower panel assembly component 22 which could otherwise lead to pull-through or dislodgment of at least one of the fastener assemblies 111, as well as the loosening of the same, with respect to its mounted position upon the main or primary lower panel assembly component 22. To the contrary, as a result of the structural arrangement of each one the fastener assemblies 111, the pulling forces are integrated into the various structural components comprising the main or primary lower panel assembly component 22 whereby, for example, a pulling force exerted or impressed upon one side surface of the main or primary lower panel assembly component 22 will likewise be exerted or impressed upon the opposite side surface of the main or primary lower panel assembly component 22. It is lastly noted that as a result of the particular structure comprising the fastener assemblies 111, as well as being able to maintain the structural integrity of the fastener assemblies 111, air leakage from one side of the thermal type bulkhead member 10 to the other side of the thermal type bulkhead member 10 can effectively be prevented.

In a similar manner, and with reference now being made to FIG. 21, which comprises an enlarged view that illustrates a second embodiment of one of the fastener assemblies, it is noted that those structural components of the fastener assembly, as disclosed within FIG. 21 and which correspond to the structural components of the fastener assembly as disclosed within FIG. 20, will be designated by corresponding reference characters except that they will be within the 200 series. Accordingly, it is seen that the second embodiment fastener assemblies are designated by the reference character 211, and in addition, it is seen that, in lieu of the tubular sleeve-type member 113 having the bowed structure, each one of the fastener assemblies 211 comprises an externally threaded tubular member 213 through which the shank portion 217 of the rivet or similar type fastener passes. Accordingly, as was the case with the fastener assemblies 111, when the rivet or similar type fastener is operatively connected to the externally threaded tubular member 213, the threads of the externally threaded tubular member 213 will effectively engage laterally spaced internal portions of the internal open-cell foam core member or structure 262 such that any collapsing together of the oppositely disposed plastic sheets or panels 252,252 will effectively be prevented.

Lastly, in connection with the various embodiments of fastener assemblies for securing handles, or other components or devices, upon the primary or main lower panel assembly components of the thermal type bulkhead members, when it is desired, for example, to mount or secure a handle, or other component or device 309, upon only one of the oppositely disposed plastic sheets or panels 352,352 of the main or primary lower panel assembly component 322 of the thermal type bulkhead member, either one of the fastener assembly embodiments as illustrated within FIG. 22 may be employed. In conjunction with the description of such panel assembly and fastener embodiments, it is to be noted that those structural components of the fastener assemblies, as disclosed within FIG. 22 and which correspond to the structural components of the fastener assemblies as disclosed within FIGS. 20 and 21, will be designated by corresponding reference characters except that they will be within the 300 and 400 series. For example, in accordance with a third embodiment of a fastening assembly, and with reference being particularly made to the upper one of the fastening assemblies illustrated within FIG. 22, a grommet-type member 313 is mounted upon or within the selected one of the oppositely disposed plastic sheets or panels 352,352 of the main or primary lower panel assembly component 322 of the thermal type bulkhead member, and it is seen that the grommet-type member 313 has flanged or headed members 315,315 which engage both the internal and external surface portions of the selected one of the plastic sheets or panels 352, although it is again noted that, since the polyvinylchloride (PVC) coated fabric would normally be disposed over the external surface portions of the plastic sheets or panels 352,352, but for clarity purposes, the polyvinylchloride (PVC) coated fabric has not been illustrated within FIG. 22, the external flanged or headed portion 315 of the grommet-type member 313 will be engaged and seated upon the polyvinylchloride (PVC) coated fabric.

In addition, a rivet-type fastener 317 is operatively inserted through or mounted within the tubular shank portion of the grommet-type member 313 whereby the head portion 319 of the rivet-type fastener 317 cooperates with the external flanged or headed portion 315 of the grommet-type member 313 so as to effectively capture and secure the handle, or other component or device, 309 therebetween. As can also be seen further from FIG. 22, and with particular reference being made to the lower one of the illustrated fastener assemblies, in lieu of the grommet-type member 313 comprising the integrally formed tubular shank portion and the flanged or headed members 315,315 for engaging both the external and internal surface portions of the selected one of the oppositely disposed plastic sheets or panels 352,352 of the main or primary lower panel assembly component 322 of the thermal type bulkhead member, this lower fastener assembly is seen to comprise a tubular or sleeve-type member 413 inserted through or mounted within the selected one of the oppositely disposed plastic sheets or panels 352,352 of the main or primary lower panel assembly component 322 of the thermal type bulkhead member, and an external seal member 415. A rivet-type fastener 417 is then operatively inserted through or mounted within the tubular or sleeve-type member 413 whereby the rear or internal end portion 421 of the rivet-type fastener 417 engages the internal surface portion of the plastic sheet or panel 352, while the head portion 419 of the rivet-type fastener 417 cooperates with the external seal member 415 so as to effectively capture and secure the handle, or other component or device, 409 therebetween. It is of course to be appreciated that either one of the illustrated upper or lower fastener assemblies may be used as desired or depending upon availability of the same.

Figure 23:
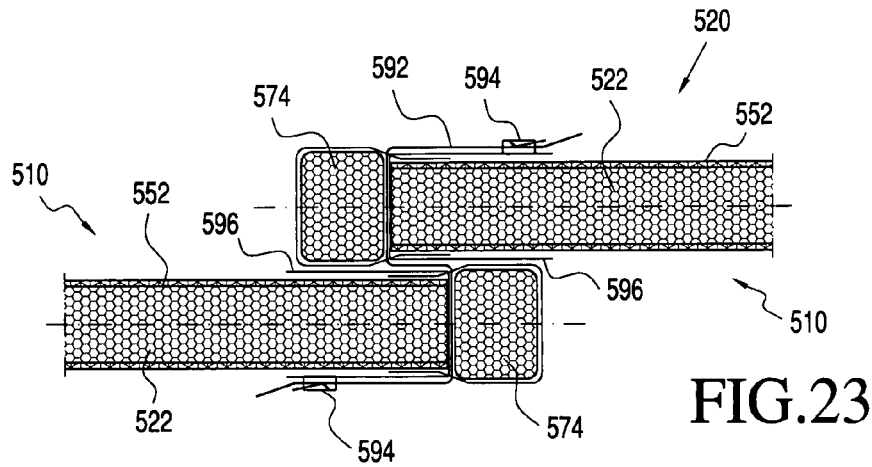
FIG. 23 is a cross-sectional view, similar to that of FIG. 3, showing, however, another embodiment of a pair of thermal type bulkhead members operatively connected together in their laterally overlapped mode and positionally adjusted with respect to each other, by means of a plurality of S-shaped strapping members, only one of which is visible, so as to form a new and improved thermal type bulkhead assembly in accordance with the principles and teachings of the present invention such that the oppositely disposed, laterally outward side edge portions of the thermal type bulkhead members can be operatively disposed into engagement with the oppositely disposed internal side wall portions of the refrigerated cargo container having the predetermined width dimension.
Figure 24:
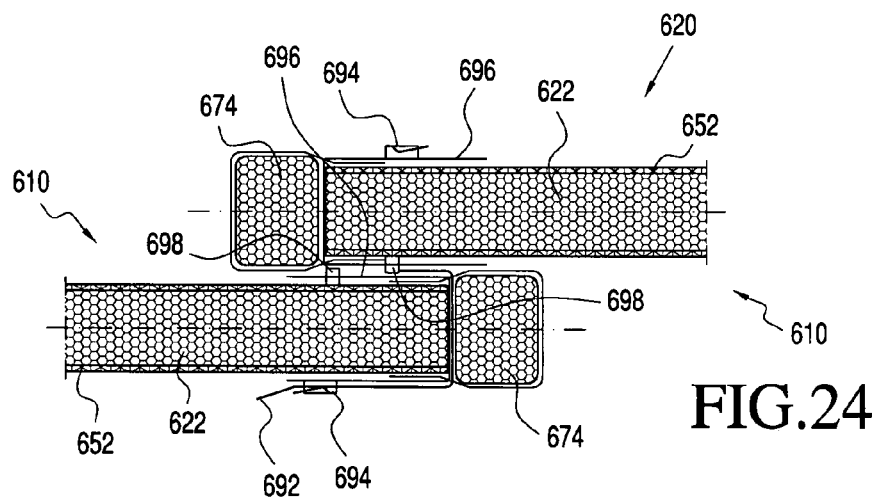
FIG. 24 is a cross-sectional view similar to that of FIG. 23 showing, however, still another embodiment of a pair of thermal type bulkhead members operatively connected together in their laterally overlapped mode and positionally adjusted with respect to each other by means of a plurality of C-shaped strapping members, only one of which is visible, so as to form a new and improved thermal type bulkhead assembly in accordance with the principles and teachings of the present invention.
Figure 25:
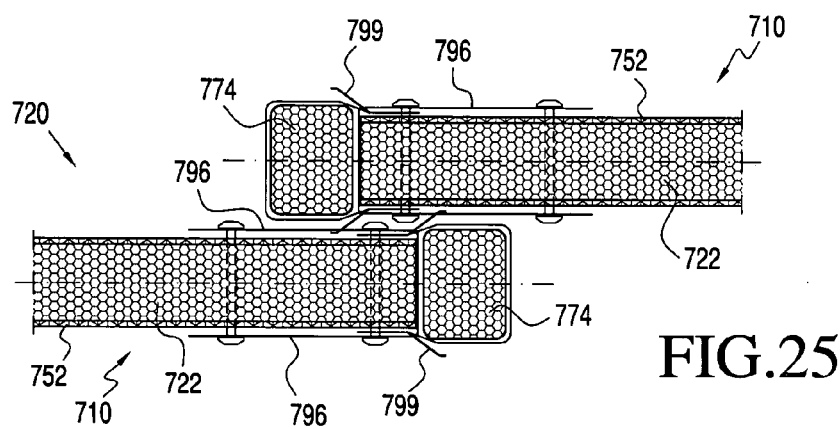
FIG. 25 is a cross-sectional view similar to those of FIGS. 23 and 24 showing, however, still another embodiment of a pair of thermal type bulkhead members operatively connected together in their laterally overlapped mode and positionally adjusted with respect to each other by means of a plurality of male and female, hook and slot, mechanical fasteners so as to form a new and improved thermal type bulkhead assembly in accordance with the principles and teachings of the present invention.

With reference now being made to FIGS. 23–25, additional embodiments of fastening means, for connecting together the pair of thermal type bulkhead members comprising the thermal type bulkhead assembly, are disclosed. As is readily appreciated, FIG. 23 is similar to FIG. 3, however there are subtle differences between the illustrated fastening systems, which will of course be disclosed and discussed. It is firstly noted, however, for example, that those structural components of the fastening means, as disclosed within FIG. 23 and which correspond to the structural components of the fastening means as disclosed within FIG. 3, will be designated by corresponding reference characters except that they will be within the 500 series. Accordingly, it is noted that, in accordance with the principles and teachings comprising the fastening means embodiment as illustrated within FIG. 23, the substantially S-shaped tensioning straps 592,592, in lieu of being routed around the external surface portions of the edge seal members 574,574, as was the case with the substantially S-shaped tensioning straps 92,92 being routed around the external surface portions of the edge seal members 74,74, are routed in such a manner as to respectively pass through the thermal type bulkhead members 510,510 so as to respectively be interposed between each one of the edge seal members 574,574 and the side edge portion of the associated main or primary lower panel assembly component 522,522 of the thermal type bulkhead member 510,510. It is further noted that the opposite ends of the tensioning straps 592,592 are of course connected to suitable tensioning or tie-down mechanisms, cam buckle mechanisms, or the like, 594,594 which are, of course, fixedly mounted upon suitable C-shaped mounting brackets 596,596 which are routed around the side edge portions of the panel assembly components 522,522 and are secured to the plastic sheets or panels 552,552.

Continuing further, and with reference now being made to FIG. 24, it is again noted that those structural components of the fastening means, as disclosed within FIG. 24 and which correspond to the structural components of the fastening means as disclosed within FIG. 23, will be designated by corresponding reference characters except that they will be within the 600 series. Accordingly, it is noted that in accordance with the principles and teachings comprising the fastening means embodiment as illustrated within FIG. 24, the substantially S-shaped tensioning straps 592,592 have effectively been eliminated, and in lieu thereof, a substantially C-shaped tensioning strap 692 has been utilized. Each one of the thermal type bulkhead members 610,610, in addition to having the suitably adjustable tensioning or tie-down mechanisms, cam buckle mechanisms, or the like, 694,694, as mounted upon the suitable mounting brackets 696,696, further comprises fixed fastening means 698,698 which are also secured to the mounting brackets 696,696 which extend around the side edge portions of the panel assembly components 622,622 and are mounted upon the plastic sheets or panels 652,652. In this manner, only a single adjustment needs to be made to positionally adjust one of the thermal type bulkhead members 610 with respect to the other one of the thermal type bulkhead members 610. It is also noted each one of the thermal type bulkhead members 610,610 is provided with both the adjustable and fixed fastening means 694,698 in order to preserve the symmetrical, reversible, and universal utility of the thermal type bulkhead members 610,610. It is further noted that when the substantially C-shaped tensioning strap 692 is effectively adjustably connected to the particular one of the thermal type bulkhead members 610, it is routed in such a manner as to pass through the particular one of the thermal type bulkhead members 610 so as to be interposed between the edge seal member 674 and the side edge portion of the associated main or primary lower panel assembly component 622 of the thermal type bulkhead member 610.

In connection with a last embodiment of such fastening assemblies for connecting the pair of thermal type bulkhead members together, the same is disclosed within FIG. 25. As was noted in connection with the fastening means of FIGS. 23 and 24, those structural components of the fastening means, as disclosed within FIG. 25 and which correspond to the structural components of the fastening means as disclosed within FIGS. 23 and 24, will be designated by corresponding reference characters except that they will be within the 700 series. Accordingly, it is noted that in accordance with the principles and teachings comprising the fastening means embodiment as illustrated within FIG. 25, the substantially S-shaped tensioning straps 592,592 and the substantially C-shaped tensioning straps 692 have effectively been eliminated, and in lieu thereof, a plurality of male and female hook and slot mechanical connectors have been employed.

More particularly, it is seen that in lieu of the substantially C-shaped mounting brackets 596,696, a pair of plate-type mounting brackets 796,796 are secured to the oppositely disposed plastic sheets or panels 752,752 of each one of the main or primary lower panel assembly components 722, 722, and it is noted that each one of the mounting brackets 796,796 is provided with a linear array of female slots, not shown. In addition, it is also seen that each one the mounting brackets 796,796 is provided with a male hook member 799, 799. Accordingly, by suitably engaging a particular one of the male hook members 799,799 disposed upon each one of the mounting brackets 796,796 within a corresponding one of the female slots, not shown, defined within the other one of the mounting brackets 796,796, the thermal type bulkhead members 710,710 can be adjustably fixed together so as to properly define the thermal bulkhead assembly 720. It is to be further appreciated that each one of the thermal type bulkhead members 710,710 is still symmetrical and reversible so as to preserve the universal nature of each one of the thermal type bulkhead members 710,710.

Figure 26:
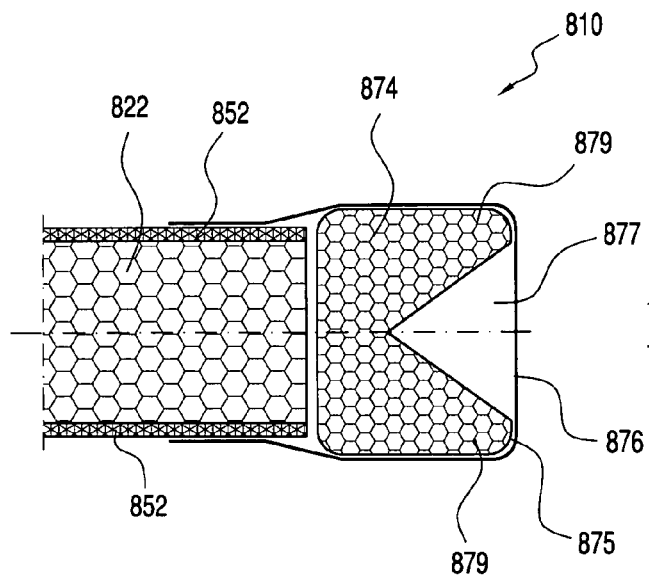
FIG. 26 is a cross-sectional view similar to that of FIG. 15 showing, however, a modified V-shaped notched embodiment of a side edge seal structure of a thermal type bulkhead member for facilitating the engagement of an interior side wall surface portion of a refrigerated container.
Figure 27:
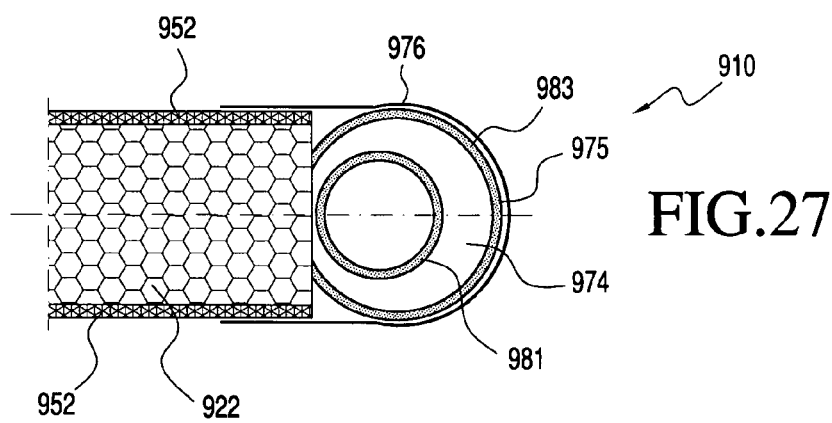
FIG. 27 is a cross-sectional view similar to that of FIGS. 15 and 26 showing, however, a modified concentric tubular embodiment of a side edge seal structure of a thermal type bulkhead member for facilitating the engagement of an interior side wall surface portion of a refrigerated container.
Figure 28:
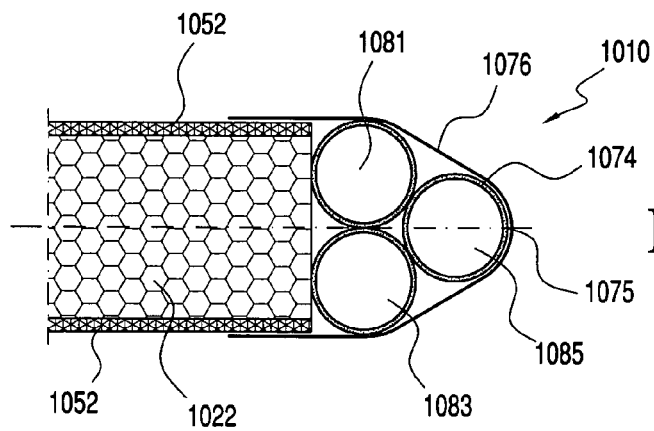
FIG. 28 is a cross-sectional view similar to that of FIGS. 15, 26, and 27 showing, however, a modified triangular arrangement of tubular members comprising a side edge seal structure of a thermal type bulkhead member for also facilitating the engagement of an interior side wall surface portion of a refrigerated container.

With reference lastly now being made to FIGS. 26–28, additional embodiments of side edge seal members, for sealingly engaging the internal side walls of the refrigerated container, are envisioned. As is readily appreciated, for example, FIG. 26 is similar to FIG. 15, however there are differences between the illustrated structures comprising the side edge seal members, as will be disclosed and discussed. It is firstly noted, however, for example, that those structural components of the side edge seals, as disclosed within FIG. 26 and which correspond to the structural components of the side edge seal members as disclosed in FIG. 15, will be designated by corresponding reference characters except that they will be within the 800 series. More particularly, it is noted that, in lieu of the side edge seal structure characteristic of the side edge seal member 74 as disclosed within FIG. 15 wherein it is noted that the side edge seal member 74 has a substantially square-shaped cross-sectional configuration, the side edge seal member 874, as constructed in accordance with the teachings and principles of the present invention and as illustrated within FIG. 26, has a notched cross-sectional configuration wherein the edge surface 875, which is adapted to be disposed, for example, in sealed engagement with a side wall surface of the refrigerated container, is seen to have a substantially V-shaped recess 877 defined therein which effectively divides the side edge seal member 874 into two laterally separated sections 879, 879. As a result of such aforenoted structure, it can be appreciated that a predetermined amount of flexibility and resiliency are inherently imparted to the side edge seal member 874. Accordingly, depending upon the direction in which the thermal type bulkhead member 810 will be moved in a manner similar to that as illustrated in FIG. 2 and as denoted by means of the directional arrow M when the thermal type bulkhead member 810 is moved into position with respect to one of the interior side wall surfaces of the refrigerated container, then the particular one of the two laterally separated section 879,879 will effectively deflect so as to permit the sealing edge surface 875 of the side edge seal member 874 to in fact sealingly engage the interior side wall surface of the refrigerated container. It is also noted that the residual or main body portion of the overall side edge seal member 874 also serves to impart a predetermined amount of rigidity to the side edge seal member 874. In this manner, once the thermal type bulkhead member 810 has been positioned with respect to the interior side wall surface of the refrigerated container, the side edge seal member 874 cannot be readily or easily dislodged from its engaged position with respect to the interior side wall surface of the refrigerated container.

With reference now being made to FIG. 27, an additionally modified embodiment of the side edge seal member, for sealingly engaging the interior side wall surfaces of the refrigerated container, is illustrated. As was the case with the previously described embodiments, those structural components of the side edge seal members 974, as disclosed within FIG. 27 and which correspond to the structural components of the side edge seal members as disclosed within FIGS. 15 and 26, will be designated by corresponding reference characters except that they will be within the 900 series. More particularly, it is noted that, in lieu of the side edge seal structure characteristic of the side edge seal member 74 as disclosed within FIG. 15, or in lieu of the side edge seal structure characteristic of the side edge seal member 874 as disclosed within FIG. 26, the side edge seal member 974, as constructed in accordance with the teachings and principles of the present invention and as illustrated within FIG. 27, comprises a pair of substantially concentrically or coaxially arranged tubular members 981,983. The outer tubular member 983 defines an outer surface portion 975 which is adapted to be sealingly engaged with an interior side wall surface portion of the refrigerated container, and it is further noted that the flexibility and resiliency of the outer tubular member 983 is greater than that of the inner tubular member 981.

As a result of such aforenoted structure, it can be appreciated that a predetermined amount of flexibility and resiliency, as well as a predetermined amount of rigidity, are inherently imparted to the side edge seal member assembly 974. More particularly, depending upon the direction in which the thermal type bulkhead member 910 is moved, in a manner similar to that as illustrated in FIG. 2 and as denoted by means of the directional arrow M, then when the thermal type bulkhead member 910 is moved into position with respect to one of the interior side wall surfaces of the refrigerated container, a particular one of the two oppositely disposed side portions of the outer tubular member 983 will effectively be deflected until the deflected or deformed section of the outer tubular member 983 effectively encounters the inner tubular member 981. In this manner, the sealing edge surface portion 975 of the side edge seal member 974 can easily and readily permit the side edge seal member assembly 974 to engage the interior side wall surface of the refrigerated container while the more rigid inner tubular member 981, which effectively supports the deflected or deformed outer tubular member 983, subsequently serves to maintain the side edge seal assembly 974 at its sealed position with respect to the interior side wall surface portion of the refrigerated container once the thermal type bulkhead member 910 has in fact been desirably positioned with respect to the interior side wall surface of the refrigerated container.

With reference lastly being made to FIG. 28, another modified embodiment of the side edge seal member, for sealingly engaging the interior side wall surfaces of the refrigerated container, is illustrated. As was the case with the previously described embodiments, those structural components of the side edge seal members 1074, as disclosed in FIG. 28 and which correspond to the structural components of the side edge seal members as disclosed within FIGS. 15, 26 and 27, will be designated by corresponding reference characters except for the fact that they will be within the 1000 series. More particularly, it is noted that, in lieu of the side edge seal structures characteristic of the side edge seal members as disclosed within FIGS. 15, 26, and 27, the side edge seal member 1074, as constructed in accordance with the teachings and principles of the present invention and as illustrated within FIG. 28, comprises a plurality of tubular members 1081,1083,1085 which are arranged in a substantially triangular array. The outer tubular member 1085 defines an outer surface portion 1075 which is adapted to be sealingly engaged with an interior side wall surface portion of the refrigerated container, and it is further noted that the triangular arrangement of the tubular members 1081,1083, 1085, wherein the tubular members 1081,1083,1085 can effectively move with respect to each other, imparts a predetermined amount of flexibility and resiliency for the overall side edge seal member assembly 1074.

As a result of such predetermined amount of flexibility and resiliency, as well as a predetermined amount of rigidity, since the relative movement of the tubular members 1081, 1083,1085 with respect to each other is in fact still limited as a result of the confinement of the tubular members 1081,1083,1085 within the fabric 1076, then, depending upon the direction in which the thermal type bulkhead member 1010 is moved in a manner similar to that as illustrated in FIG. 2 and as denoted by means of the directional arrow M, when the thermal type bulkhead member 1010 is moved into position with respect to one of the interior side wall surfaces of the refrigerated container, the outermost tubular member 1085 is able to effectively shift its position with respect to the inner tubular members 1081, 1083, or alternatively, the inner tubular members 1081,1083 will effectively be moved away from each other so as to permit the outermost tubular member 1085 to move partially therebetween. In either case, the sealing edge surface portion 1075 of the side edge seal member assembly 1074 can easily and readily engage the interior side wall surface of the refrigerated container while the inherent rigidity of the side edge seal member assembly 1074 subsequently serves to maintain the side edge seal member assembly 1074 at its sealed position with respect to the interior side wall surface portion of the refrigerated container once the thermal type bulkhead member 1010 has in fact been desirably positioned with respect to the interior side wall surface of the refrigerated container.

Thus, it may be seen that in accordance with the principles and teachings of the present invention, there has been disclosed a new and improved thermal type bulkhead assembly which comprises a pair of new and improved thermal type bulkhead members which are adapted to be adjustably positioned with respect to each other in an overlapped mode in the widthwise direction whereby oppositely disposed side edge portions of the pair of bulkhead members can effectively engage the oppositely disposed interior side walls of the refrigerated cargo container, while upper sections of the bulkhead members comprise spring assemblies which can flexibly and adjustably engage the ceiling portion of the refrigerated cargo container. In this manner, the lateral extent or width dimension X of the thermal type bulkhead assembly, as well as the vertical extent or height dimension Y of the thermal type bulkhead assembly, can be adjustably varied whereby the thermal type bulkhead assembly of the present invention is effectively universal in structure so as to be capable of being utilized within different refrigerated cargo containers characterized by means of different internal width and height dimensions. The side edge regions of each bulkhead member, as well as the upper edge portion of each bulkhead member, are also provided with unique edge seal structures so as to enable or achieve good sealing properties with respect to the interior side wall and ceiling portions of the refrigerated cargo container.

Obviously, many variations and modifications of the present invention are possible in light of the above teachings. For example, while the use of open-cell foam has been discussed, described, and illustrated as being preferable, the use of closed-cell foam may also be implemented. It is therefore to be understood that within the scope of the appended claims, the present invention may be practiced otherwise than as specifically described herein.

What is claimed as new and desired to be protected by Letters Patent of the United States of America, is:

1. An expandable/contractible universal thermal bulkhead assembly for use within refrigerated cargo containers having different predetermined interior width and height dimensions as respectively defined between oppositely disposed side wall members, and between oppositely disposed floor and ceiling members, comprising:

a first thermal bulkhead member having predetermined height and width dimensions;

first means bendably disposed upon an upper end portion of said first thermal bulkhead member for effectively varying said predetermined height dimension of said first thermal bulkhead member, when said first means is bent from a first position to a second position, and for resiliently engaging the ceiling member of a refrigerated cargo container;

a second thermal bulkhead member having predetermined height and width dimensions;

second means bendably disposed upon an upper end portion of said second thermal bulkhead member for effectively varying said predetermined height dimension of said second thermal bulkhead member, when said second means is bent from a first position to a second position, and for resiliently engaging the ceiling member of the refrigerated cargo container; and means for adjustably connecting said first thermal bulkhead member with respect to said second thermal bulkhead member so as to adjustably vary the overall width dimension of said thermal bulkhead assembly, as defined by said first and second thermal bulkhead members, whereby said thermal bulkhead assembly comprises a universal thermal bulkhead assembly which can extend between and engage the oppositely disposed side wall members, and which can extend between and engage the oppositely disposed floor and ceiling members, of a refrigerated cargo container regardless of the fact that different refrigerated cargo containers can have different predetermined interior width and height dimensions as respectively defined between the oppositely disposed side wall members, and between the oppositely disposed floor and ceiling members.

2. The universal thermal bulkhead assembly as set forth in claim 1, wherein:

said first and second thermal bulkhead members are disposed in a laterally overlapped mode so as to adjustably vary said overall width dimension of said thermal bulkhead assembly; and said means for adjustably connecting said first thermal bulkhead member with respect to said second thermal bulkhead member is selected from the group comprising at least one S-shaped tensioning strap, at least one C-shaped tensioning strap, and male and female fastening members.

3. The universal thermal bulkhead assembly as set forth in claim 1, wherein:

said first means bendably disposed upon said upper end portion of said first thermal bulkhead member, and said second means bendably disposed upon said upper end portion of said second thermal bulkhead member, comprise spring members.

4. The universal thermal bulkhead assembly as set forth in claim 3, wherein each one of said spring members comprises:

a central, internal core spring member; and an external foam blanket enveloping said central, internal core spring member.

5. The universal thermal bulkhead assembly as set forth in claim 4, wherein:

said external foam blanket comprises a foam member selected from a group comprising open-cell and closed-cell foams.

6. The universal thermal bulkhead assembly as set forth in claim 4, wherein:

said central, internal core spring member comprises an array of leaf spring members.

7. The universal thermal bulkhead assembly as set forth in claim 4, wherein:

said central, internal core spring member comprises an array of wire-form spring members.

8. The universal thermal bulkhead assembly as set forth in claim 1, wherein each one of said first and second thermal bulkhead members comprises:

a pair of laterally spaced, oppositely disposed plastic sheets; and a foam core member interposed between said pair of laterally spaced, oppositely disposed plastic sheets.

9. The universal thermal bulkhead assembly as set forth in claim 8, further comprising:

stiffener rib means interposed between said pair of laterally spaced, oppositely disposed plastic sheets for maintaining the structural integrity of each one of said first and second thermal bulkhead members.

10. The universal thermal bulkhead assembly as set forth in claim 9, wherein:

said stiffener rib means, interposed between said pair of laterally spaced, oppositely disposed plastic sheets, is interposed between sections of said foam core member and is not fixedly connected to said pair of laterally spaced, oppositely disposed plastic sheets.

11. The universal thermal bulkhead assembly as set forth in claim 1, wherein:

each one of said first and second thermal bulkhead members is symmetrical and reversible wherein each side edge portion of each one of said first and second thermal bulkhead members may be disposed toward either one of left and right side walls of the refrigerated cargo container, and each side surface of each one of said first and second thermal bulkhead members may be disposed toward either one of front and rear walls of the refrigerated cargo container; and said first and second means, respectively bendably disposed upon said upper end portions of said first and second thermal bulkhead members between said first and second positions, can be bent in either one of two opposite directions so as to resiliently engage the ceiling member of the refrigerated cargo container.

12. The universal thermal bulkhead assembly as set forth in claim 11, further comprising:

adjustment strap means mounted upon said first and second thermal bulkhead members and operatively connected to said first and second means respectively bendably disposed upon said upper end portions of said first and second thermal bulkhead members for implementing bending movements of said first and second means between said first and second positions in said opposite directions.

13. The universal thermal bulkhead assembly as set forth in claim 1, further comprising:

handle means fixedly mounted upon opposite side surfaces of said first and second thermal bulkhead members for facilitating the movement of said first and second thermal bulkhead members within the refrigerated cargo container.

14. The universal thermal bulkhead assembly as set forth in claim 2, further comprising:

side edge seal means, disposed upon opposite side edge portions of each one of said first and second thermal bulkhead members, for defining sealed engagement with the oppositely disposed side walls of the refrigerated cargo container, as well as for defining sealed engagement between side edge seal means disposed at the center of said universal thermal bulkhead assembly when said first and second thermal bulkhead members are disposed in said laterally overlapped mode with respect to each other.

15. The universal thermal bulkhead assembly as set forth in claim 14, wherein:
   each one of said side edge seal means is encased within a fabric coated with a material selected from the group comprising neoprene, butyl, styrene-butadiene rubbers.

16. The universal thermal bulkhead assembly as set forth in claim 15, wherein:
   a thin layer of polyvinylchloride (PVC) is disposed upon an internal surface portion of said fabric.

17. The universal thermal bulkhead assembly as set forth in claim 2, further comprising:
   edge seal means, disposed upon said first and second means bendably disposed upon said upper end portions of said first and second thermal bulkhead members, for defining sealed engagement with the ceiling member of the refrigerated cargo container when said first and second thermal bulkhead members are disposed in said laterally overlapped mode with respect to each other.

18. The universal thermal bulkhead assembly as set forth in claim 17, wherein:
   each one of said edge seal means is encased within a fabric coated with a material selected from the group comprising neoprene, butyl, styrene-butadiene rubbers.

19. The universal thermal bulkhead assembly as set forth in claim 18, wherein:
   a thin layer of polyvinylchloride (PVC) is disposed upon an internal surface portion of said fabric.

20. The universal thermal bulkhead assembly as set forth in claim 1, further comprising:
   kickplate means fixedly secured to the lower end portion of each one of said first and second thermal bulkhead members for protection of said lower end portions of said first and second thermal bulkhead members against abrasion during movement of said first and second thermal bulkhead members relative to the floor region of the refrigerated cargo container.

21. The universal thermal bulkhead assembly as set forth in claim 1, further comprising:
   whisker brush means fixedly mounted upon lower end portions of said first and second thermal bulkhead members for effectively sealing the floor region of the refrigerated cargo container when the floor region of the refrigerated cargo container comprises corrugated structure.

22. An expandable/contractible universal panel assembly for use within room chambers having different predetermined interior width and height dimensions as respectively defined between oppositely disposed side wall members, and between oppositely disposed floor and ceiling members, comprising:
   a first panel member having predetermined height and width dimensions;
   first means bendably disposed upon an upper end portion of said first panel member for effectively varying said predetermined height dimension of said first panel member, when said first means is bent from a first position to a second position, and for resiliently engaging the ceiling member of a room chamber;
   a second panel member having predetermined height and width dimensions;
   second means bendably disposed upon an upper end portion of said second panel member for effectively varying said predetermined height dimension of said second panel member, when said second means is bent from a first position to a second position, and for resiliently engaging the ceiling member of the room chamber; and
   means for adjustably connecting said first panel member with respect to said second panel member so as to adjustably vary the overall width dimension of said panel assembly, as defined by said first and second panel members, whereby said panel assembly comprises a universal panel assembly which can extend between and engage the oppositely disposed side wall members, and which can extend between and engage the oppositely disposed floor and ceiling members, of a room chamber regardless of the fact that different room chambers can have different predetermined interior width and height dimensions as respectively defined between the oppositely disposed side wall members, and between the oppositely disposed floor and ceiling members.

23. The universal panel assembly as set forth in claim 22, wherein:
   said first and second panel members are disposed in a laterally overlapped mode so as to adjustably vary said overall width dimension of said panel assembly; and
   said means for adjustably connecting said first panel member with respect to said second panel member is selected from the group comprising at least one S-shaped tensioning strap, at least one C-shaped tensioning strap, and male and female fastening members.

24. The universal panel assembly as set forth in claim 22, wherein:
   said first means bendably disposed upon said upper end portion of said first panel member, and said second means bendably disposed upon said upper end portion of said second panel member, comprise spring members.

* * * * *